US012447366B2

(12) United States Patent
Ezra et al.

(10) Patent No.: US 12,447,366 B2
(45) Date of Patent: Oct. 21, 2025

(54) FIRE DETECTION AND SUPPRESSION SYSTEM

(71) Applicant: Highland Fire Suppression, LLC, Clearwater, FL (US)

(72) Inventors: Tal Ezra, Clearwater, FL (US); Gregory G Aymong, Mt. Sinai, NY (US)

(73) Assignee: Highland Fire Suppression, LLC, Clearwater, FL (US)

( * ) Notice: Subject to any disclaimer, the term of this patent is extended or adjusted under 35 U.S.C. 154(b) by 794 days.

(21) Appl. No.: 17/501,626

(22) Filed: Oct. 14, 2021

(65) Prior Publication Data

US 2023/0124927 A1 Apr. 20, 2023

(51) Int. Cl.

*A62C 37/40* (2006.01)
*A62C 3/02* (2006.01)
*A62C 37/10* (2006.01)
*A62C 99/00* (2010.01)

(52) U.S. Cl.

CPC ............ *A62C 37/40* (2013.01); *A62C 3/0271* (2013.01); *A62C 37/10* (2013.01); *A62C 99/0036* (2013.01)

(58) Field of Classification Search

CPC ......... A62C 2/247; A62C 5/022; A62C 37/10; A62C 99/0036; A62C 3/0271; A62C 37/40
USPC ........................................................... 169/61
See application file for complete search history.

(56) References Cited

U.S. PATENT DOCUMENTS 5,881,817 A 3/1999 Mahrt
7,164,468 B2 * 1/2007 Correia Da Silva Vilar ............... G01S 7/4802 359/227
7,712,542 B2 5/2010 Munroe
7,834,771 B2 11/2010 Lee
(Continued)

FOREIGN PATENT DOCUMENTS

CN 102784451 B 11/2012
CN 104740818 A 7/2015
(Continued)

OTHER PUBLICATIONS

International Searching Authority; International Search Report and Written Opinion of the International Searching Authority; International Application No. PCT/US22/46402; Patent Cooperation Treaty; pp. 1-11; publisher United States International Searching Authority; Published Alexandria, Virginia, US; copyright and mailing date Feb. 8, 2023; copy enclosed (11 pages).

*Primary Examiner* — Qingzhang Zhou
*Assistant Examiner* — Kevin Edward Schwartz
(74) *Attorney, Agent, or Firm* — Metz Lewis Brodman Must O'Keefe

(57) ABSTRACT

A fire detection and suppression system operates in independent autonomous modes or under human command. Optical, thermal and laser based sensors detect fire conditions. Anemometers and thermometers detect environmental conditions, allowing the system to adjust the flow of fluid from the system to the targeted flame or condition. Algorithmic analysis of the input data in connection with such preselected thresholds permits rapid detection of fire conditions and in automatic modes triggers a suppression response. A feedback loop enhances adjusts for dynamic flame and environmental conditions.

37 Claims, 16 Drawing Sheets

(56) References Cited

U.S. PATENT DOCUMENTS

| | | | | | |
|---|---|---|---|---|---|
| 8,960,318 | B2 | 2/2015 | Munroe | | |
| 10,463,898 | B1 | 11/2019 | Du Plessis | | |
| 10,512,809 | B2 | 12/2019 | Gladstone et al. | | |
| 10,850,146 | B2 * | 12/2020 | Lee | B05B 3/1035 | |
| 2004/0239912 | A1 | 12/2004 | Vilar et al. | | |
| 2006/0179934 | A1 | 8/2006 | Smith et al. | | |
| 2008/0271903 | A1 * | 11/2008 | Lindstrom | A62C 35/02 | 169/61 |
| 2016/0263410 | A1 | 9/2016 | Enk, Sr. | | |
| 2016/0271434 | A1 | 9/2016 | Dusing et al. | | |
| 2019/0099631 | A1 * | 4/2019 | Hart | A62C 31/28 | |
| 2021/0069538 | A1 * | 3/2021 | Magnone | A62C 31/24 | |
| 2021/0247074 | A1 * | 8/2021 | Sinur | F24C 15/2021 | |
| 2021/0308506 | A1 | 10/2021 | Johnson | | |
| 2022/0161083 | A1 * | 5/2022 | Bolz-Mendel | A62C 37/40 | |
| 2022/0280824 | A1 * | 9/2022 | Muhammad | A62C 37/44 | |
| 2022/0305315 | A1 * | 9/2022 | Dusing | A62C 37/04 | |

FOREIGN PATENT DOCUMENTS

| | | | |
|---|---|---|---|
| EP | 1853357 | B1 | 6/2017 |
| KR | 101760101 | B1 | 7/2016 |

* cited by examiner

Compressed Air Foam
Deluge System
Operation Matrix Schedule

● Indicates Desired Response

| Inputs | | A: Display Alarm Point Address and Description at Fire Alarm Control Panel | B: Record events in Fire Alarm Control Panel System History Memory | C: Activate Alarm LED and Audible Piezo at Fire Alarm Control Panel | D: Activate Supervisory LED and Audible Piezo at Fire Alarm Control Panel | E: Activate Trouble LED and Audible Piezo at Fire Alarm Control PAnel | F: Inhibit the Release of the foam Deluge Solenoid VValve | G | H | I | J: Activate Audible/Visible Notification Appliances Temporal Three Throughout the Building | K | L | M | N: Release foam Deluge Solenoid Valve | O | P | Q | R: Transmit Heat Detector Alarm Signal to the Central Monitoring Station | S | T: Transmit Waterflow Alarm Signal to the Central Monitoring Station | U: Transmit Manual Pull Station Alarm Signal to the Central Monitoring Station | V: Transmit Supervisory Signal to the Central Monitoring Station | W: Transmit Trouble Signal to the Central Monitoring Station |
|---|---|---|---|---|---|---|---|---|---|---|---|---|---|---|---|---|---|---|---|---|---|---|---|---|
| | | System Operation | | | | | | | | | | | | | | | | | | | | | | |
| 1 | Activation of Heat Detector | ● | ● | ● | | | | | | | ● | | | | ● | | | | ● | | | | | |
| 2 | Activation of a Foam Manual Release Station | ● | ● | ● | | | | | | | ● | | | | ● | | | | | | | ● | | |
| 3 | Activation of Alarm Discharge Pressure or Waterflow Switch | ● | ● | ● | | | | | | | ● | | | | | | | | | | ● | | | |
| 4 | Activation of Maintenance Key Switch to Disable Position | ● | ● | | ● | | ● | | | | | | | | | | | | | | | | ● | |
| 5 | Activation of Low Compressed Air Pressure Switch | ● | ● | | ● | | | | | | | | | | | | | | | | | | ● | |
| 6 | Activation of Fire Protection Vaalve Tamper Switch | ● | ● | | ● | | | | | | | | | | | | | | | | | | ● | |
| 7 | Activation of a Wire Fault, Short, Ground or Other System Failure | ● | ● | | | ● | | | | | | | | | | | | | | | | | | ● |

FIG. 11

FIRE DETECTION AND SUPPRESSION SYSTEM

FIELD OF THE INVENTION

The present invention relates to an apparatus for the automated detection and suppression of fire. More specifically, the invention relates to an opto-mechanical system which utilizes vision systems to detect and distinguish fire conditions and direct a focused suppression material to extinguish the fire with limited damage or impact to surrounding areas not involved with the fire.

BACKGROUND OF THE INVENTION

Fire is one of the biggest threats to life and property. Property damage resulting from fire adds up to billions of dollars every year. Fire safety equipment is the first line of defense against fire in its early stages and is essential to reduce its destructive effects. Emerging designs of firefighting equipment that employ thermal detection and image analysis for fire suppression typically involve functions requiring human interaction. Even automated systems may be limited by communication breakdowns between the cameras, remote processing controllers and fire, water or foam monitors. Many systems rely on personnel on or off-site to initiate and sometimes steer the fire extinguishing systems. Operator attention and diligence is essential for proper operation of these manual systems. Any lack thereof will result in failure of the fire suppression system to deploy or the initiation of an unwanted system release resulting in collateral damage and expensive cleanup costs.

Chinese Patent No. CN102784451 discloses an automatic positioning flame detection and suppression system for a three-dimensional space. The detection system comprises a front-end monitoring unit which includes multiple charge coupled device (CCD) imaging flame detectors dispersed in the relevant area. These flame detectors are connected with a remotely located control center, which is in turn connected with the firefighting unit. Fire identification processors are used for analyzing a video image by using a fire flame image identification algorithm and an image three-dimensional algorithm, capturing fire flame information of the scene, analyzing flame position, fire alarm information, the positions of the flame detectors and the flame orientation, transmitting the analysis result to a fire monitoring and managing platform and outputting a signal to an automatic fire alarming control host and the firefighting linking unit. The reference fails to provide significant detail regarding the actual calculation of these values and does not disclose how the firefighting unit is directed to the detected flames and what adjustments are made to retain focus on the dynamic fire.

Korean Patent No. KR101760101 discloses a firefighting system in which a fire extinguishing member is automatically turned to a point where a fire is detected by using a thermal image generated through a camera. The fire extinguishing system includes a first rough coordinate directional value and a control device continually reviews the detected data to dynamically generate a second coordinate value corresponding to specific high heat areas within the first coordinate area. The second coordinate value generated by the controller is received when the fire extinguishing member is oriented in the first coordinate direction as the fire extinguishing member is configured to be directed to the fire. As the fire progresses, the system continues to evaluate thermal conditions within its "window" of attention and refocus the fire suppression system to follow the temperatures, always directing to the highest temperature first and maintaining secondary targets in descending order. The system contemplates having the sensors mounted in connection with the fire suppression system and moving in concert therewith or alternatively having remotely mounted sensors which can view a larger "window" of physical area and detect and instruct the fire suppression equipment from such remote location. Finally, this reference contemplates a self-contained, robotically mounted system.

Chinese Patent Application No. CN104740818 discloses an automatic fire extinguishing system employing compressed air foam. The system detects a fire source and calculates a jet pitching angle of the gun so as to automatically adjust the direction and angle of the gun muzzle. An electric control valve is utilized to start and stop fire suppression.

Dusing, et al., United States Patent Application Pub. No. 2016/0271434 and Gladstone, et al., U.S. Pat. No. 10,512,809 relate to the FireRover device, manufactured by Fire Rover, LLC of Ferndale, Michigan. The FireRover is a manually operated fire prevention system, in which an infrared camera monitors the site in order to detect and pinpoint abnormal heat sources. The monitoring function is provided by remote human interaction which engages the foam or other suppression system to extinguish the fire.

The Therminus fire protection system is manufactured by Incendium AB, of Kungalv, Sweden. It is a manually operated fire prevention system utilizing a dual IR-camera system as well as a fire suppression system with fire suppression water monitors. Human interaction is utilized to monitor the output of the camera system and engage the water delivery system to extinguish the fire. A backup timer is provided to engage the water delivery system when unattended.

Correia Da Silva Vilar, et al., United States Patent Application Pub. No. 2004/0239912 relates to an active system for detection and localization of early stage forest fires using LiDAR. In the simplest configuration the system includes a LiDAR and a control computer that operates the beam-scanning system and performs automatic recognition of the smoke signature in the LiDAR signal on the basis of a neural-network algorithm. The scanning procedure is optimized for the given topography and other characteristics of the area under surveillance. The neural network is simulated or implemented as a co-processor. To cover wider areas, several LiDAR stations may be linked together in a network, which allows simultaneous scanning of the suspicious areas by several neighboring LiDARs in order to guarantee maximum efficiency and false alarm reduction.

Yeu Yong Lee, U.S. Pat. No. 7,834,771 discloses a system including a fire detection device and a control center terminal. The fire detection device includes a laser range finder for calculating a distance to a location of breakout of a fire. An infrared camera captures an image and transmits the image to a control unit. A CCD camera captures a CCD image and transmits the CCD image to the control unit. The control unit analyzes the infrared image, determines whether a fire has broken out, performs processing such that the CCD camera captures an area on fire, determines the location of breakout of the fire, performs processing such that the captured image is output to the control center terminal, and controls a function of a warning unit. The warning unit outputs a warning sound or a warning message.

Current automated firefighting equipment designs typically only employ thermal detection and image analysis and do not utilize advanced targeting techniques which compensate for dynamic environmental and fire suppression parameters. What is lacking in the art, therefore, is a system which includes accurate range estimation for aiming the fire suppressing foam or water spray. Moreover, dynamic temperature and windage compensation are necessary for target acquisition and tracking. Because the foam or water spray travels in a curved trajectory and not in a straight line, the effects of gravity and air resistance must be included in the aiming calculation. High sensitivity and spatial resolution of the data enables a fire to be precisely detected at the early phase of its development when the fire is still easy to extinguish.

SUMMARY OF THE INVENTION

A fire detection and suppression system is primarily directed to industrial and commercial applications where fire poses a threat to personnel and property. The system may operate in independent autonomous modes or under human command. It provides visual and graphic information to a remote user or operator through the use of optical and thermal cameras which may be directed at a fire condition. More particularly, the cameras are utilized to scan a preselected area of interest and indicate a fire condition. The cameras may be part of a matrix of sensor devices including without limitation multiple cameras, or may operate individually as part of a self contained or independent system. Additional sensors include laser rangefinders, anemometers and thermometers for detecting and reporting environmental conditions. This is particularly related to the system's ability to compensate for environmental factors when attempting to suppress a fire, including the impact on the flow of fluid from the system to the targeted flame or condition. Automated and/or processor control permits independent modes of operation as well as facilitating remote operation under human control.

The control system takes inputs from various sensors in addition to environmental conditions, including those related to the operating condition of the device and the status of its components and depletable stores of electricity, air, water and/or foam materials. Detection of flame conditions is based upon thermal and optical imagery within a field of view that is broken down into segments associated with preselected thresholds for alarm conditions, which may include temperature, color, contrast or the like. Algorithmic analysis of the input data in connection with such preselected thresholds permits rapid detection of fire conditions and in automatic modes triggers a suppression response. A fluid dispensing mechanism is associated with the thermal and optical cameras and may be directed in conjunction with such cameras or independently under the control of the system. Electric motors are incorporated into the mounting hardware to permit multi-axial steering and focus for cameras, other detectors and the suppression mechanism. In embodiments, the cameras and other aiming sensors are mounted in conjunction with the fluid dispensing nozzle and are mounted on a support structure which includes the conduit through which the fire suppression fluid is conveyed from storage to delivery. The conduit, in the form of an armature, requires flexibility or at least movability that does not restrict the multi-axial movement of the fire suppression nozzle and cameras while maintaining the fluid flow therethrough. Preferably, the cameras and fire suppression nozzle are mounted on a mast or other support some distance from the floor or skid which permits a clear view of the area of interest and unobstructed fluid path from system to flame.

In fixed embodiments, the fluid for suppression of fire may be stored in individual component tanks, such as water and detergent or concentrate for the creation of foam. These may be mixed through a conventional valving and piping system prior to introduction of air in a manifold. In mobile embodiments, it is preferable to premix the water and concentrate into a single fluid which is stored in a pressurized tank. Pressurized air is also stored in conjunction with the system and is introduced to the fluid through a manifold. It may also be preferable to store the fluids, including air, at one pressure and reduce that pressure for operation. The combined fluid and air are dispensed through the nozzle and are precisely aimed at the flame.

Several modes of fire suppression are contemplated depending on environmental factors and the causes of the fire. These may include direct suppression, indirect suppression or oscillation of the nozzle. The system includes a feedback loop to enhance accuracy and to adjust for dynamic flame and environmental conditions. Most particularly, changes in temperature and wind direction and magnitude have a direct impact on the shape and parabolic arc of fluid stream flows which may require continuous adjustment to maintain proper contact with the fire.

These and other advantages and features of the present invention will be more fully understood upon reference to the presently preferred embodiments thereof and to the appended drawings.

BRIEF DESCRIPTION OF THE DRAWINGS

FIG. 11 is a diagrammatic representation of alarm conditions of the fire detection and suppression system.

DESCRIPTION OF THE PREFERRED EMBODIMENTS

Figure 1:
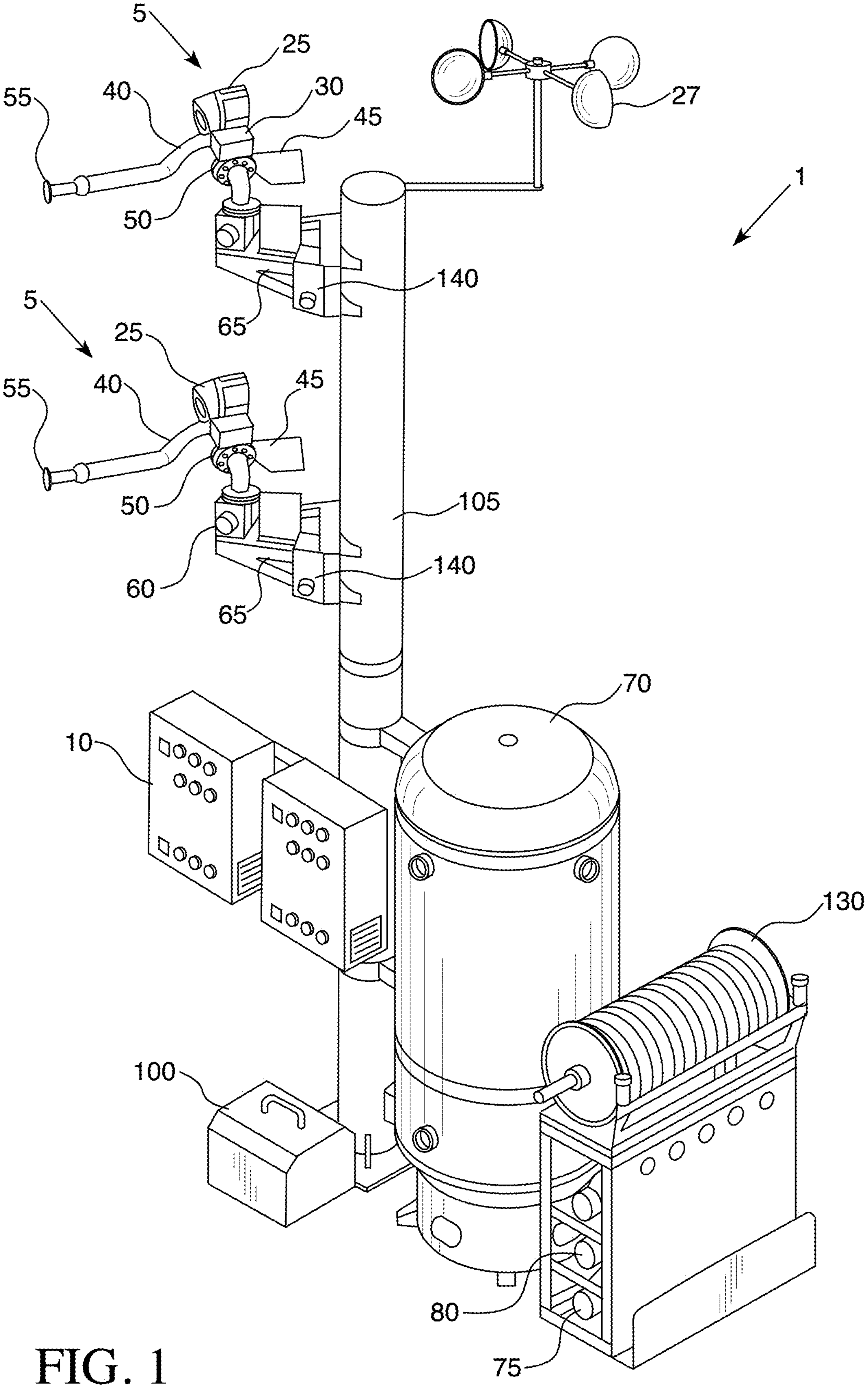
FIG. 1 is an isometric view of a fixed embodiment of the fire detection and suppression system having two camera sensors with related suppression systems.

Referring now to FIGS. 1 and 2, a fire detection and suppression system 1 is composed of four main subsystems: the fire detection subsystem 5, the control subsystem 10, the fire suppression activation subsystem 15 and the monitoring and management subsystem which is generally associated with control system 10. The system 1 exists in two primary embodiments, fixed and mobile. However, while fixed systems are typically "hard wired" to building or other electrical and water supplies, mobile systems may be selectively connected to such local electrical or water supplies or may be partially or wholly self-contained. Additionally, mobile embodiments may be skid or pallet mounted and portable through the use of external means, such as a forklift, or may be equipped with wheels and be entirely self-contained even with respect to the mobile apparatus. Finally, the mobile embodiment may be self-propelled with the ability to direct itself to the flame location, as will be discussed more fully below. In general, other than as specifically identified below, each embodiment operates and is constructed in a similar manner. One or more alarm indicators 140 may provide local audible or visual indications of conditions, such as active fire.

Figure 2A:
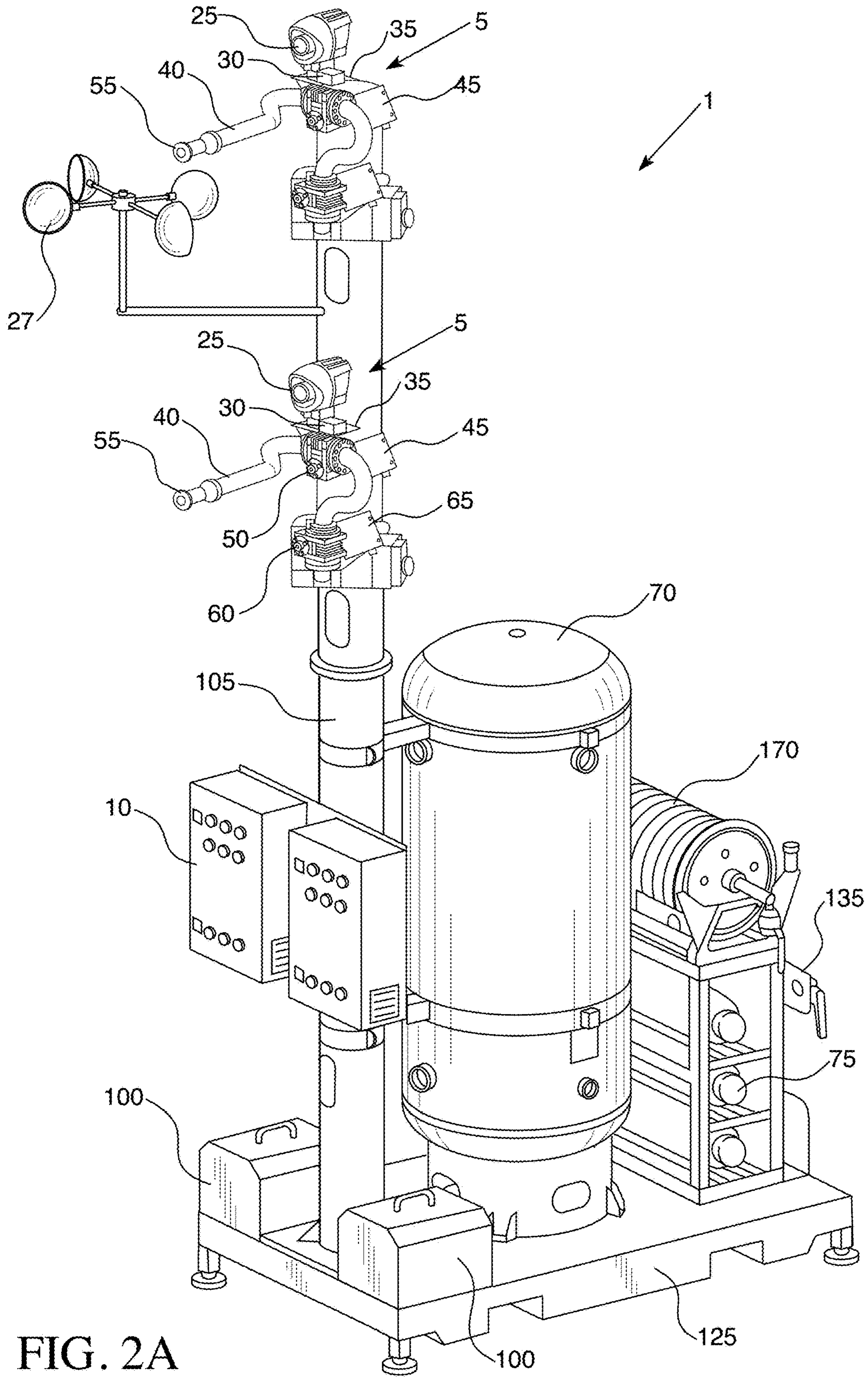
FIG. 2A is an isometric view of a skid embodiment of the fire detection and suppression system having two camera sensors with related suppression systems and mounted on a single platform which may be fixed or mobile.
Figure 2B:
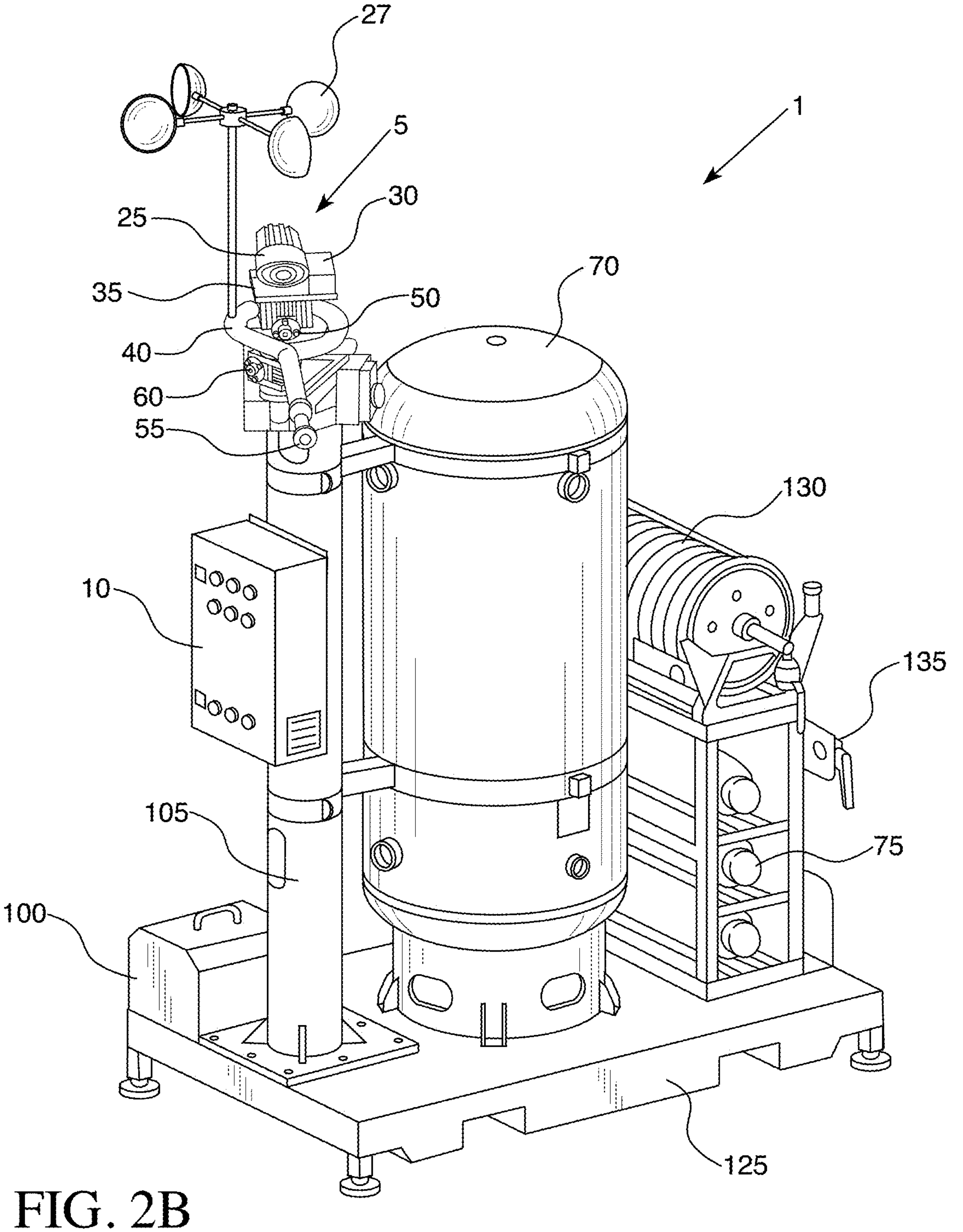
FIG. 2B is an isometric view of a skid embodiment of the fire detection and suppression system having one camera sensor with related suppression system and mounted on a single platform which may be fixed or mobile.
Figure 2C:
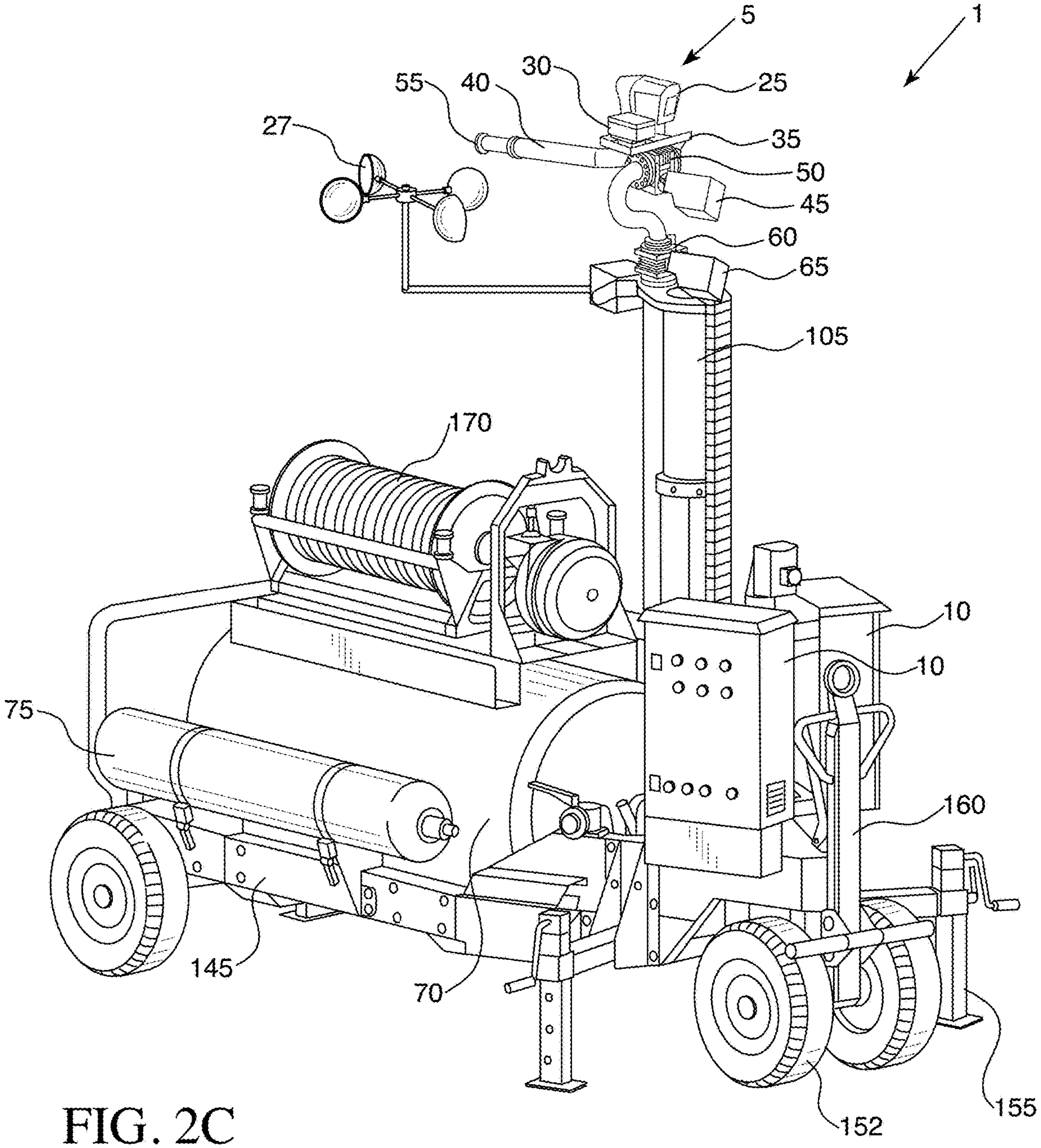
FIG. 2C is an isometric view of a mobile embodiment of the fire detection and suppression system having a single camera thermal sensor and which may be self-propelled.

A fixed system 1 is illustrated in FIG. 1, while FIGS. 2A and 2B illustrate a system 1 mounted on a skid 125. FIG. 2C illustrates a system 1 mounted on a movable trolley having a trolley frame 145 and wheels 150. Outriggers 155 are selectively extendable to provide additional stability in a parked position. Steering control 160 permits a manual operator to move and direct the movement of the trolley mounted system 1.

Each system 1 is generally provided with one or more fire detection systems 5 which are mounted on mast 105. Mast 105 may be adjustable in height, manually or under the control of control subsystem 10. In embodiments, control subsystem 10 may be mounted on mast 105 or otherwise positioned for ease of operation. In a fixed embodiment, control subsystem 10 may be mounted remotely from system 1. In a fixed embodiment, power may be supplied from local sources and hard wired to system 1. Battery 100 may be provided to ensure a constant source of power in the event of an outage of the primary electrical feed. In mobile embodiments, battery 100 provides the entire requirement of system 1 for power. It is to be specifically noted that battery 100 may be of any size or type or comprise multiple cells. As with control subsystem 10, mounting of the battery 100 on a skid or trolley is required for mobile embodiments but optional for fixed embodiments. Fluid tank 70 provides the primary reservoir for the fire suppression fluid, as will be more fully described below. Air for mixing with fire suppression fluid to create foam and to assist in the generation of a fire suppressing fluid stream is stored in air tanks 75. In embodiments, optional manual hose 170 is mounted on hose reel 130 and manually operated by activation of manual control valve 135 for manual distribution of fire suppression fluid.

Figure 3:
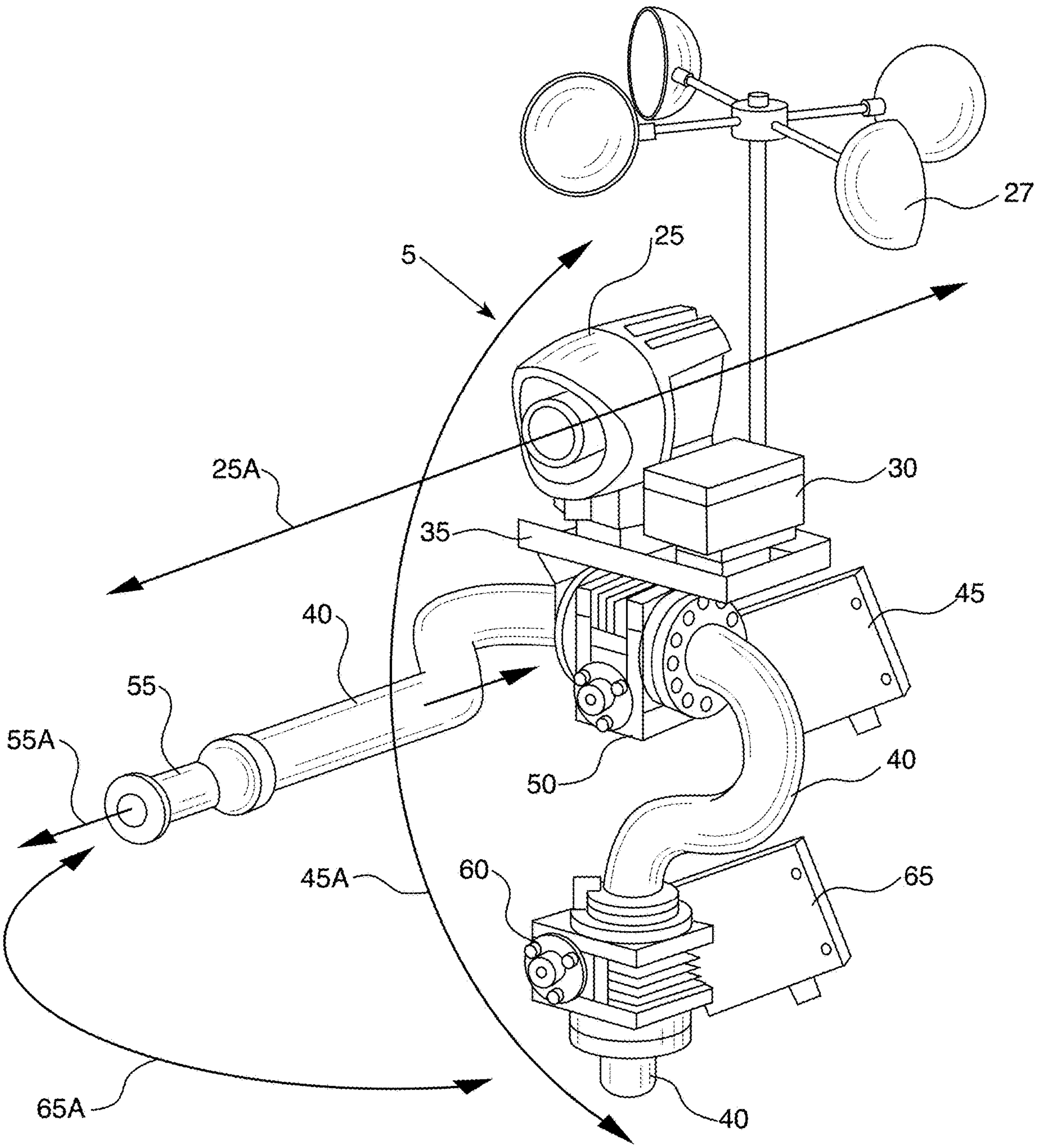
FIG. 3 is an isometric view of a camera sensor with related suppression system.

In mobile embodiments, with specific reference to FIG. 2C and general reference to FIGS. 1-3, a mobile embodiment of system 1 is mounted on trolley frame 145 and may be self-propelled and entirely self-contained. The mobile embodiment has two primary means of mobile operation/control, remote controlled or autonomous. Remote control would be provided by a conventional hand held remote controller (not shown) with transceivers provided for wireless communication. Alternatively, the self-guided model could follow a preselected floor path which is driven by proximity detectors or systems as simple as following a painted line on a floor. Conventional path learning systems are within the ambit of one skilled in the art and would be adapted to navigate an interior or exterior space. Additionally, a device could be preprogrammed to traverse a preselected path on a timed basis, similar to a human watchman. While systems operating in a normal environment may include real time communications with a management system, an autonomous unit would also include preprogrammed capabilities to operate without any intervention, management or communication with external devices. The system has the ability to locate a fire and initiate the alarm, detection, and suppression sequence. The system can also transmit its location to a remote operator who in turn can assist in the proper navigation of the autonomous vehicle.

Systems 1 may also include the ability to communicate electronically with remote cameras not associated with the system, as may be located conventionally within the building or protected area or mounted on a drone.

Fire Detection Subsystem

Referring now to FIGS. 1-3, fire detection subsystem 5 includes a thermal camera 25 and a targeting system 30 which itself includes a laser rangefinder, thermometer, and anemometer/vane 27. Thermal camera 25 and targeting system 30 are mounted on base 35 which is rotatably mounted in association with primary armature 40. Thermal camera 25 is aimed along camera axis 25A. While primary armature 40 is illustrated in FIG. 3 as having a particular geometry, it is to be specifically understood that any geometry which directs the appropriate components and subsystems in the appropriate direction is contemplated. Primary armature is comprised of hollow tubing which is structurally capable of supporting the weight and motion of the components while providing a fluid path for the fire suppression material, as will be discussed more fully below. Base 35 with affixed thermal camera 25 and targeting system 30 is rotatably interconnected and sealingly engaged with primary armature 40 which will permit the rotation of base 35 relative to at least a portion of primary armature 40 while maintaining the sealed fluid connection along primary armature 40. Vertical electric motor 45 is engaged by conventional means such as mechanical vertical gearbox 50 to base 35 and primary armature 40 to permit controlled arcuate vertical displacement of base 35, thermal camera 25 and targeting system 30 along vertical axis 45A. Primary armature 40 terminates in a controllable nozzle 55 for ultimate emission of fire suppression material along nozzle axis 55A. Nozzle axis 55A and camera axis 25A are generally parallel but may be adjusted such that the axes 25A and 55A converge at a specific distance for enhanced accuracy within a tolerance range of such preselected distance.

Horizontal displacement of thermal camera 25, targeting system 30 and nozzle 55 is accomplished by displacement of primary armature 40 at horizontal gearbox 60 and horizontal electric motor 65 in a manner similar to vertical displacement above, including the sealing interconnection with primary armature 40. Horizontal displacement occurs along arcuate horizontal axis 65A.

In operation, fire detection subsystem 5 scans for fire with thermal camera 25. Irrespective of the reference to thermal camera, the imaging system included within thermal camera 25 is both thermal and long range optical and should not be limited in any way to detection method or sensor.

Figure 5A:
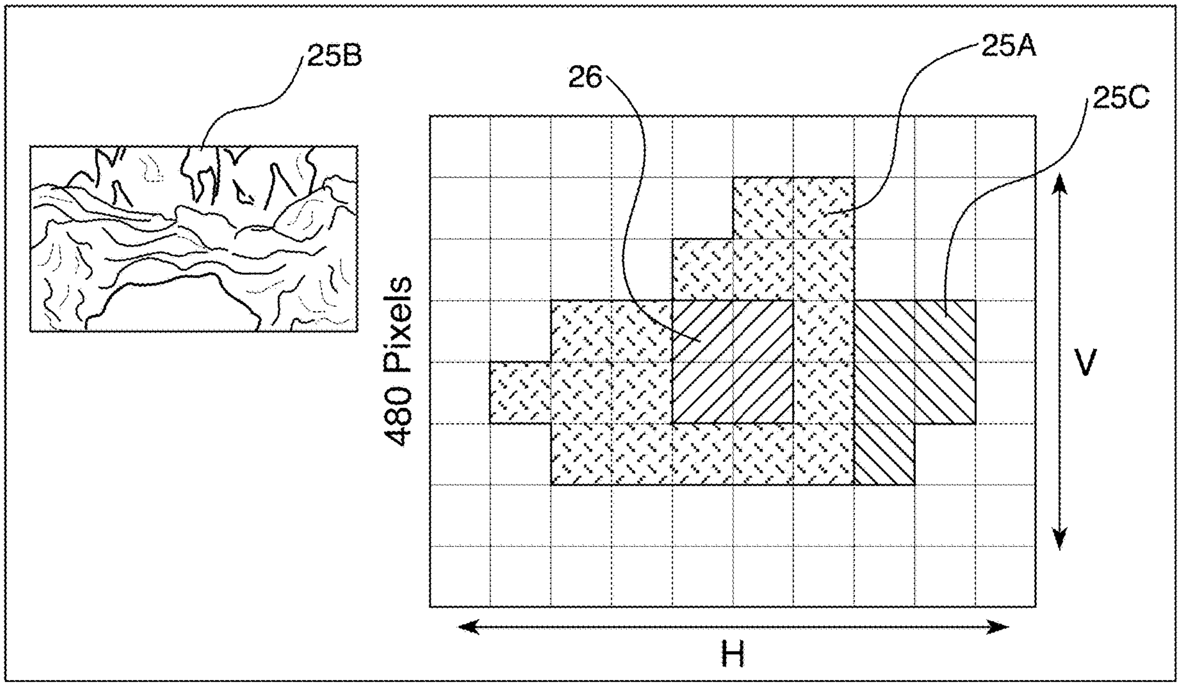
FIG. 5A is a first graphic representation of the detection of the flame as seen from the thermal camera sensor.
Figure 5B:
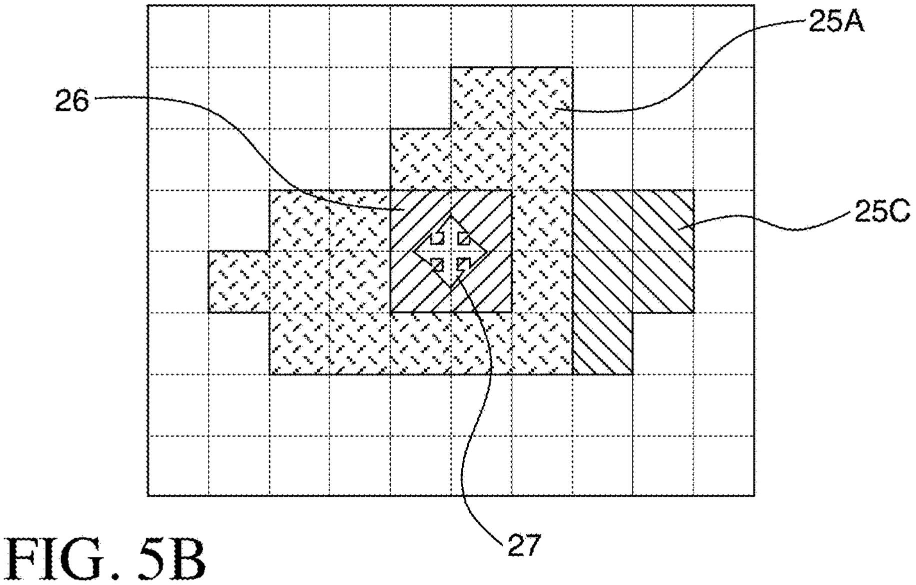
FIG. 5B is a second graphic representation of the detection of the flame as seen from the thermal camera sensor.

Thermal camera 25 is equipped with internal processing capabilities and continuously scans the video feed to identify flame conditions. Thermal camera 25 analyzes the flame's size, movement, intensity and behavior to target the hottest region of the flame and preferably has a field of view of 54.5 degrees vertically and 73.2 degrees horizontally. Consideration of broader or narrower specifications will be based upon the application and in light of relative distances and size of area to be viewed by thermal camera 25. A non-limiting example of a thermal camera is the Sii AT Fire Detection model from Opgal Optronic Industries Ltd. of Karmiel, Israel. Referring now to FIGS. 5A and 5B, thermal camera 25 includes a detector which scans the visual area. Thermal camera 25 may be panned and the entire visible region is divided into scan sectors. Each sector is reduced from a visible image 25B to a pixelated image 25A. The pixels 25C are each mapped to a particular section of the sensor of thermal camera 25. The visible radiation from each sector and pixel 25C is analyzed individually and the temperature for each is recorded and translated into pixelated image 25A. The detection of temperatures above a preselected threshold will be mapped as different colors in a visible viewer or as numerical values within the processor. A conjunction of elevated temperatures within a region indicates flame conditions. Thermal Camera 25 is preprogrammed to search for targets that are at least one square foot in size. Each sector is scanned for two to three seconds. If no fire is detected, the system moves on to scan the adjacent sector.

Thermal camera 25 instantly determines if an area meets the criteria for fire and once identified, it analyzes the flame's size, movement, intensity, and behavior to target the hottest region of the flame based upon the assigned values of pixels 25C within pixilated image 25A, as illustrated by flame pixel indicator 26. It should be noted that in an autonomous mode, no visible indication of flame is necessary, and these functions will be calculated mathematically within the processing capability of thermal camera 25.

Thermal camera 25 communicates directly with the fire detection subsystem 5. This system is in direct electronic communication with motors 45, 65 to aim nozzle 55 at the hottest region of the fire, or center of flame 27.

Targeting system 30 includes a laser rangefinder for determining the distance to the fire detected by thermal camera 25. The laser rangefinder includes LiDAR (light detection and ranging) capabilities to measure the distance to the burning object by timing a laser flash. Fire detection is particularly suited to LiDAR operation, as its wavelength range, preferably 100-1000 nm, corresponds to the characteristic dimension of soot and water particles comprising smoke. The application of LiDAR as part of the fire detection system provides an important advantage over visible or infrared imaging based upon the above as well as its accuracy is not generally affected by the condition of the target surface, or the angle of incidence of the laser beam. Targeting system 30 further comprises at least one thermometer and anemometer in order to measure ambient temperature and wind speed. As will be discussed in more detail below, this informs the determination of trajectory and aiming utilizing the movement of the nozzle 55 in conjunction with vertical and horizontal electric motors 45, 65.

Nozzle 55 controls the flow of various fire suppression fluids, which may include compressed air foam (CAF) or water flowing through primary armature 40. Primary armature 40 is fabricated from curved pipe sections that form an outlet to which nozzle 55 is mounted and an inlet that connects to a supply of CAF or water. The pipe sections are connected together to form a curved fluid passageway.

Control Subsystem

Control subsystem 10 includes a processing system which may include a processor, dynamic memory and static memory. An interface provides electronic communication with the other subsystems as more fully described below. A programmable logic controller (PLC), intelligent embedded array or other well known processing device which may include software or firmware controls and electronically interacts with the other subsystems. The processor is provided with a predetermined set of mathematical algorithms which are used to obtain input information from thermal camera 25 and targeting system 30 in order to dynamically operate vertical and horizontal electric motors 45, 65 and nozzle 55 to deliver the fire suppression fluids precisely on the base of the fire to be extinguished. The algorithms consider environmental factors as well as fluid characteristics such as foam expansion in determining the precise adjustments to be made to the direction of nozzle 55 and the force of the fluid to be delivered.

Once control subsystem 10 has identified the flame target, it interacts with fire control subsystem 5 to calculate the range and distance from the nozzle 55. Consistent with traditional trajectory calculations, the elevation angle of the nozzle 55 must be calculated and communicated to vertical electric motor 45 for movement of vertical gearbox 50 to change the vertical axis 45A of nozzle 55. The azimuth angle is also calculated and communicated to horizontal electric motor 65 to change the horizontal axis 65A of nozzle 55. Each is determined using computational fluid dynamics simulations in order to both initially set and then adjust each of the axes 45A, 65A, based upon the variables discussed below.

Figure 6:
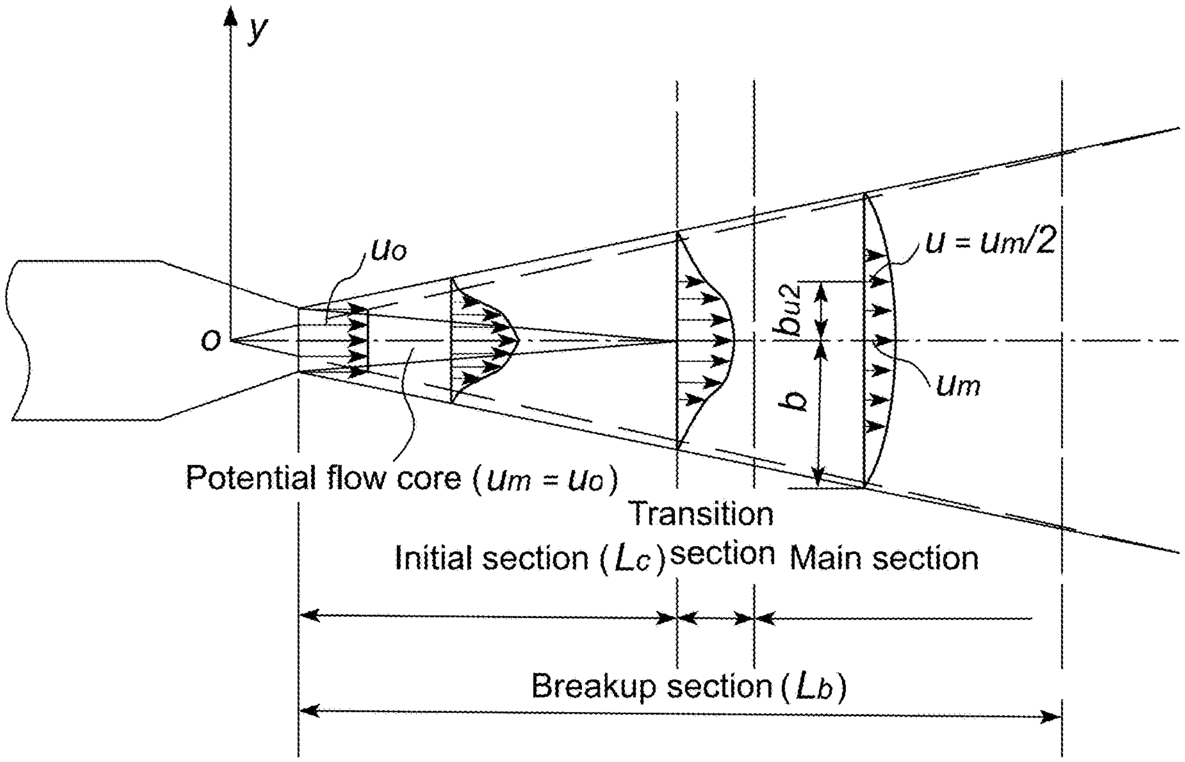
FIG. 6 is a diagrammatic representation of fluid flow from a fire suppression device.

Vertical axis 45A is adjusted to ensure that the foam-water stream with entrained foam bubbles leaves nozzle 55 as a narrow stream of single phase water/liquid foam concentrate of known density. Referring now to FIG. 6, the initial stream is high density and low volume and is influenced largely by velocity and gravity. With respect to foam expansion, compressed air foam is typically 3% or 6% fluorine free foam concentrate in water. When exiting the nozzle 55, the foam/water combination forms a single phase dense liquid stream and ultimately expands into a fully developed two-phase low-density stream of stable aqueous foam. The effects of gravity and air resistance vary with the decreasing density and increasing cross sectional area of the foam stream, reducing the velocity and thus the distance it travels before landing on the ground. This requires continuous adjustment of the vertical axis 45A. The detection of air flow or wind speed, particularly perpendicular to the stream flow direction also requires continuous adjustment of horizontal axis 65A to keep the foam steam on target. As stored within foam tank 80, the water/foam mixture is under a very high pressure to achieve the required range and is in the form of a liquid/liquid mixture. Once the liquid-liquid mixture exits the tip of the nozzle, it begins to transform into a liquid/air bubble mixture which expands in diameter with greatly reduced density. These two factors reduce the effect of momentum which decreases the range and greatly increase the effect of aerodynamic drag, slowing the stream down and reducing the range. In addition, the expanded size of the stream increases the influence of ambient wind conditions which will greatly impact the trajectory of the foam stream depending upon whether it is a headwind, tail wind, or cross wind.

Environmental factors affecting targeting are also considered. For example, when extinguishing outdoor fires, the system must compensate for ambient wind conditions to focus the foam or water stream directly onto the fire. Ambient wind is characterized by magnitude and direction. The foam or water stream can be exposed to variable wind speed and a wide range of wind conditions including head wind, cross wind, or tail wind, each of which has a different impact on the range and direction of the foam stream which must be corrected to maintain the foam delivery onto the targeted surface.

Foam or water spray away from the targeted flame, commonly known as drift, is a problem especially when the fire suppression system is installed outdoors. The impact of drift includes a lower foam or water application rate than intended on the target, which can impair firefighting efforts and waste valuable foam and water and damage to susceptible off-target areas.

As wind speed increases, both the amount of foam/water lost from the target area and the distance it moves downwind increases. The effects of wind on a foam or water spray can be minimized with improved target acquisition by utilizing the wind speed and direction from anemometer 27, the straight-line distance to the fire, which is determined from the rangefinder, and the straight-line azimuth angle to the fire.

The system is designed to set the correct azimuth angle and elevation angle to deliver a steady, pulsating, or oscillating stream of foam or water on the fire. The optical camera and rangefinder determine how close to the fire the first pulse landed, the azimuth and elevation angles would then be readjusted, and the process is rapidly repeated until the target is hit. Based upon the optical camera's measured impact of the first pulse of foam or water on the fire, the system would then either continue in the individual pulse mode or into a continuous foam stream until the optical camera system detected that the fire had been extinguished.

Figure 4A:
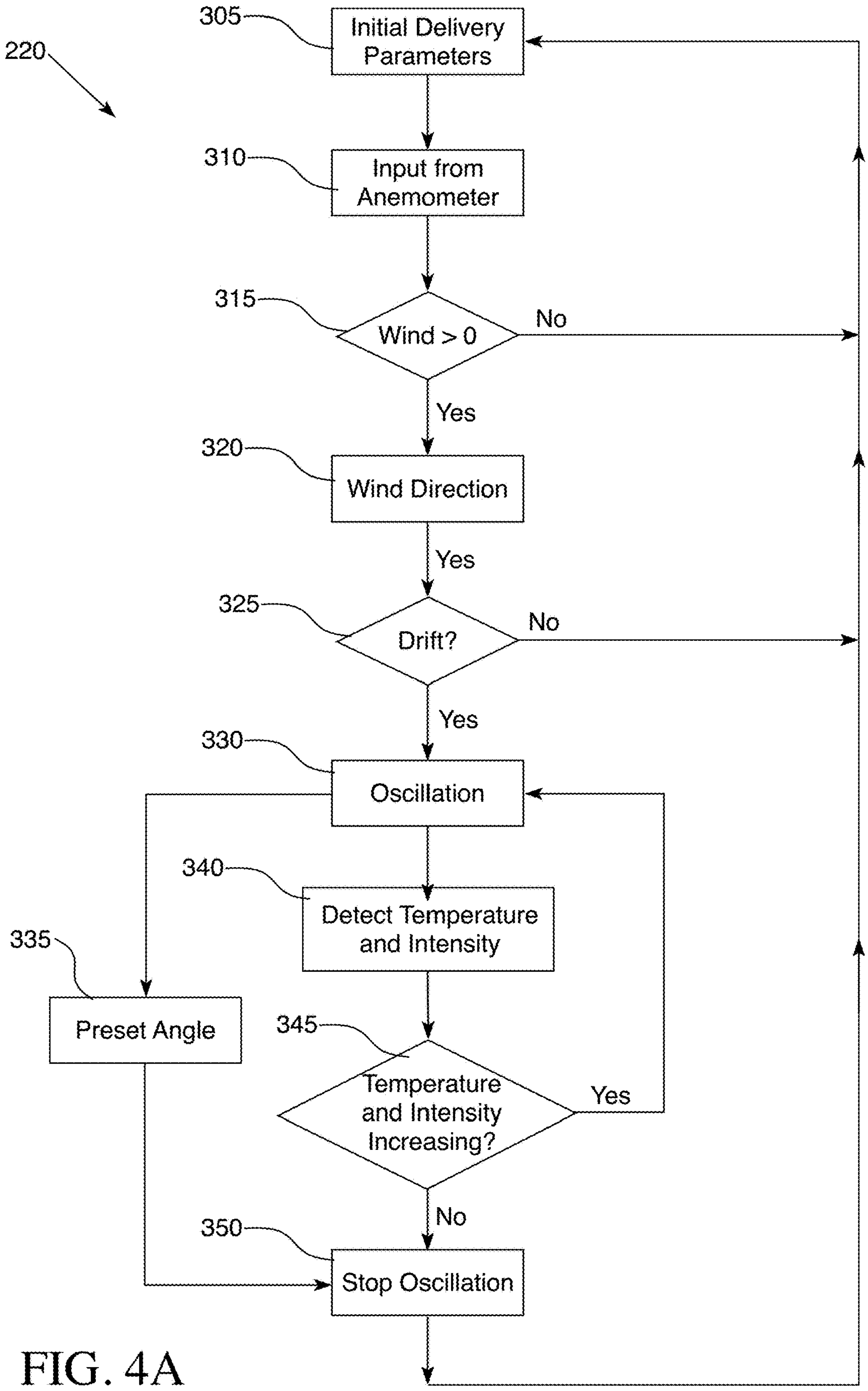
FIG. 4A is a diagrammatic representation of the fluid flow adjustment process tree.
Figure 4B:
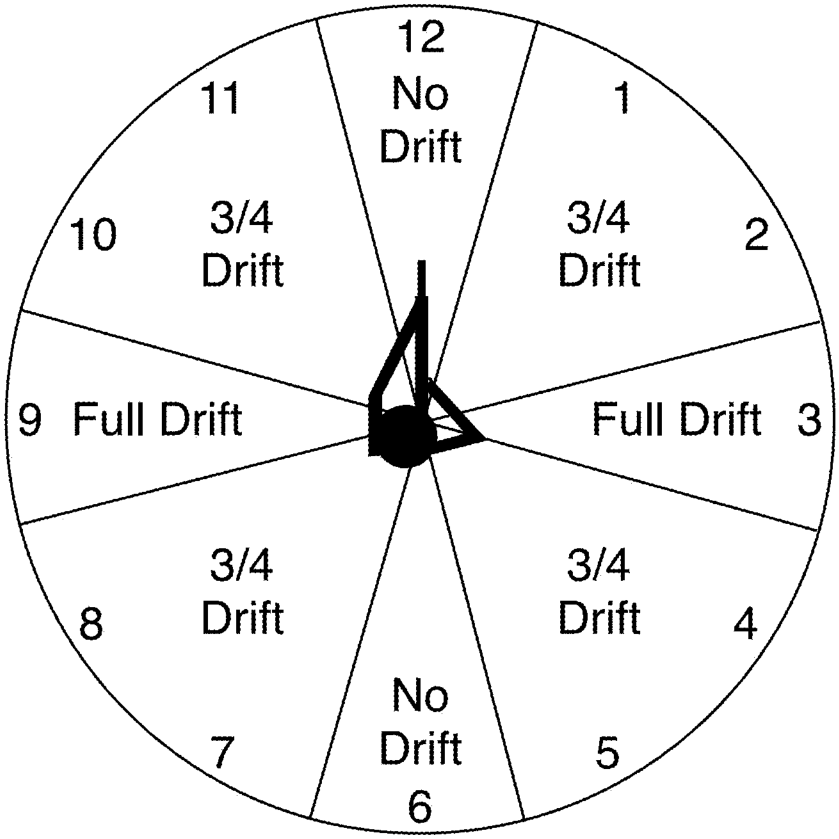
FIG. 4B is a diagrammatic representation of a drift adjustment chart.
Figure 7A:
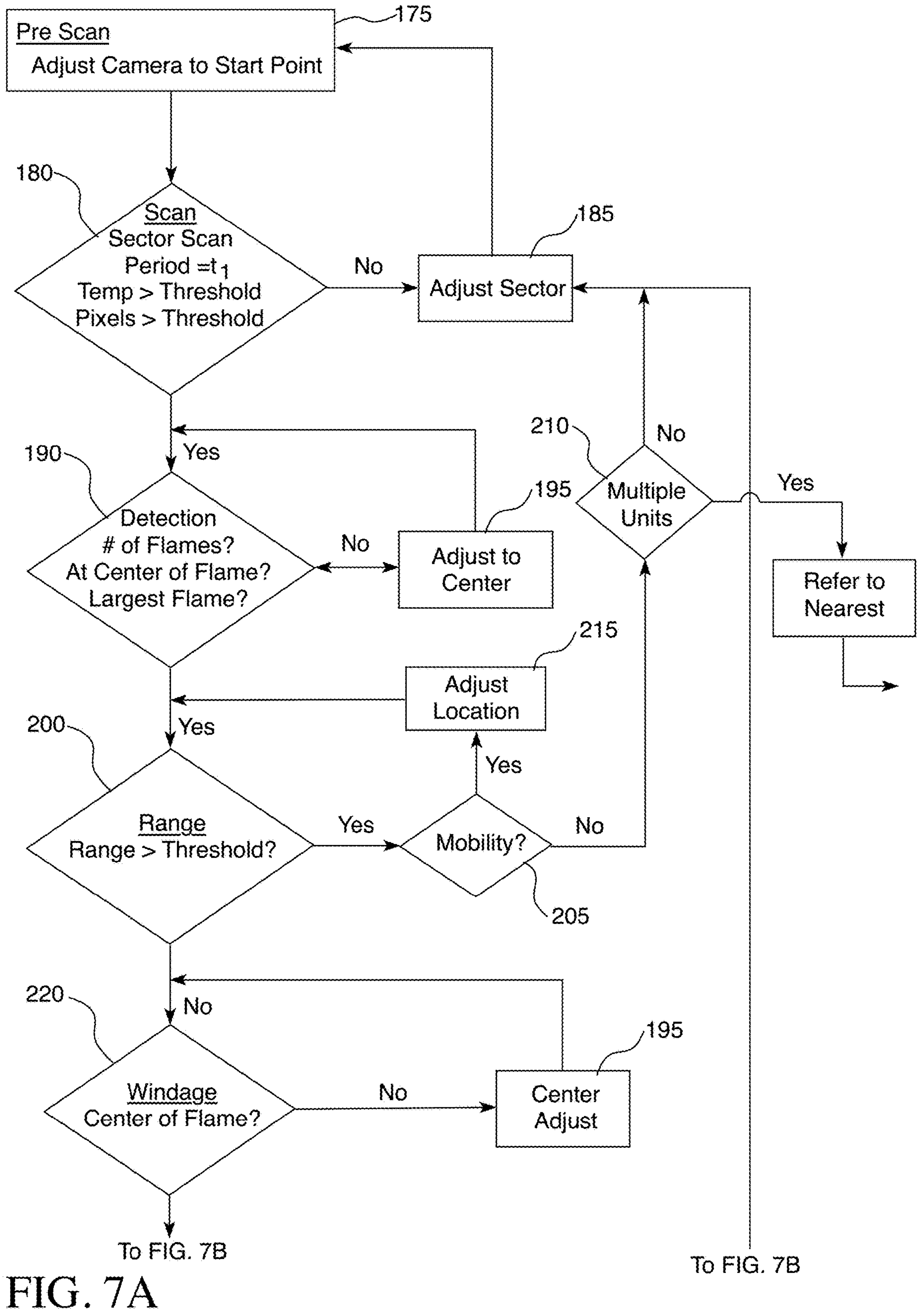
FIG. 7A is a diagrammatic representation of the fire detection and suppression process tree.
Figure 7B:
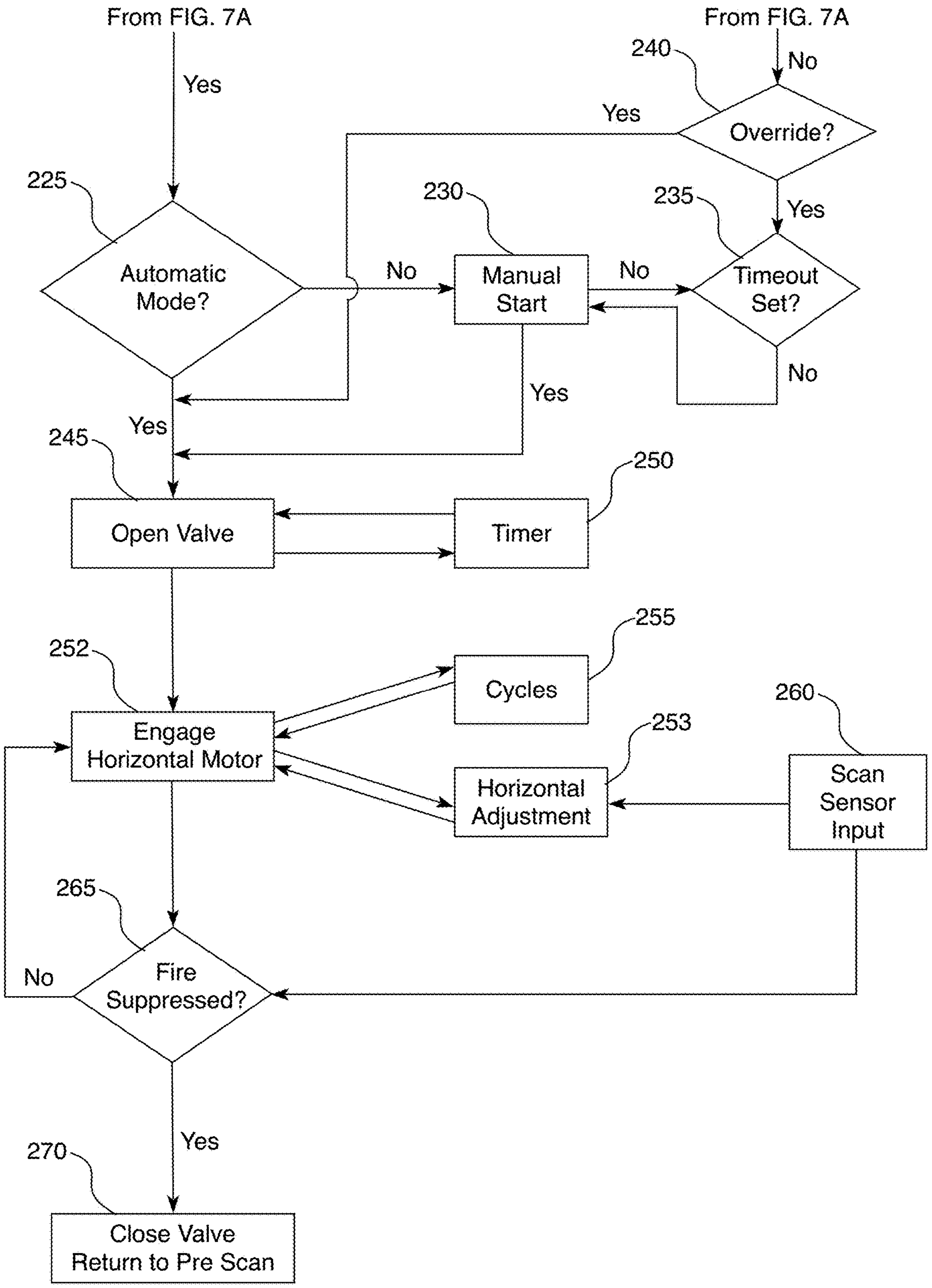
FIG. 7B is a continuation of FIG. 7A.

In more detail, and referring to FIG. 4A, windage correction mode 220, as more fully integrated into the system with respect to FIG. 7, begins with the initial delivery parameters 305 as set by system defaults. At anemometer input step 310, data is obtained from the digital anemometer 27, and an evaluation is made at wind detection mode 315. If the wind value is zero, then the system reverts to the initial delivery parameters 305 and continues to monitor wind conditions until a non-zero value is detected. When a non-zero value is detected at wind detection mode 315, wind direction mode 320 establishes the direction of the wind and drift detection mode 325 identifies whether or not drift is occurring. It should be noted that drift does not occur to the extent that the wind direction is axially aligned with nozzle 55 and the stream of fluid. To the extent that drift is not occurring, the system reverts to initial delivery parameters 305 and continues to monitor changes in the wind direction. To the extent that drift is detected at drift detection mode 325, oscillation mode 330 is enabled. Oscillation mode 330 rotates horizontal electronic motor 65 and/or vertical electronic motor 45 as necessary to correct angulation and azimuth of the nozzle 55 to deliver the fluid to the appropriate location. This may be accomplished by reference to a preselected database of angular adjustments at angular data 335, categorized by wind direction and intensity or enter a dynamic feedback loop including temperature and intensity detection mode 340 which queries the thermal camera 25 and targeting system 30 to detect changes in temperature and intensity of the target. FIG. 4B illustrates diagrammatically the calculation of drift dependent upon the angulation of the wind direction as detected at wind direction mode 320. Fractional values may be utilized to finely adjust present tabular parameters for drift adjustment as set forth in Table I below. With respect to the dynamic detection and windage adjustment, to the extent that temperature and/or intensity are increasing during oscillation at temperature change mode, oscillation continues until the point of highest temperature and/or intensity is located. In either optional mode path, oscillation is terminated at oscillation termination step 350 upon reaching a preselected angulation and/or the point of highest intensity or temperature. It should be specifically noted that angular data 335 may contain data relating to both horizontal and vertical adjustments of nozzle 55.

Angular data 335 may be in the form of Table I below and FIG. 4B.

TABLE I

| Values in degrees. | | | | | | | |
|---|---|---|---|---|---|---|---|
| Range | Wind Speed (mph) | | | | | | |
| (ft) | 0 | 5 | 10 | 15 | 20 | 25 | 30 |
| 0 | 0 | 0 | 0 | 0 | 0 | 0 | 0 |
| 30 | 0 | 0 | 0 | 2 | 5 | 10 | 12 |
| 60 | 0 | 5 | 10 | 20 | 25 | 30 | 30 |

A numerical model was constructed and analyzed utilizing computational fluid dynamics (CFD). Simulations were performed using an exact geometric model of the foam nozzle, the hydrodynamic properties of the fluid (water and foam concentrate), and the transient pressure characteristics of the pressurized fluid. All naturally occurring indoor and outdoor wind speeds and directions were included in the simulations (crosswind, tailwind, or headwind). The computational data was analyzed against real world test data using the full-scale model of the monitor system under indoor (no wind) and outdoor wind conditions to calibrate the computational data. The field calibrated foam trajectory/range versus system operating pressure, nozzle azimuth angle, elevation angle, and wind speed and direction were plotted in a series of parametric curves. Algorithms were derived for each curve using curve fitting techniques and they were then programmed into the trajectory determination system which controls the azimuth and elevation drives and the system operating pressure to ensure rapid aiming and target "lock on" features.

To conserve foam supply during the nozzle aiming process, the system can deliver single shots of foam or multiple bursts before locking onto the target and delivering a continuous stream of foam to extinguish the fire.

Figure 8A:
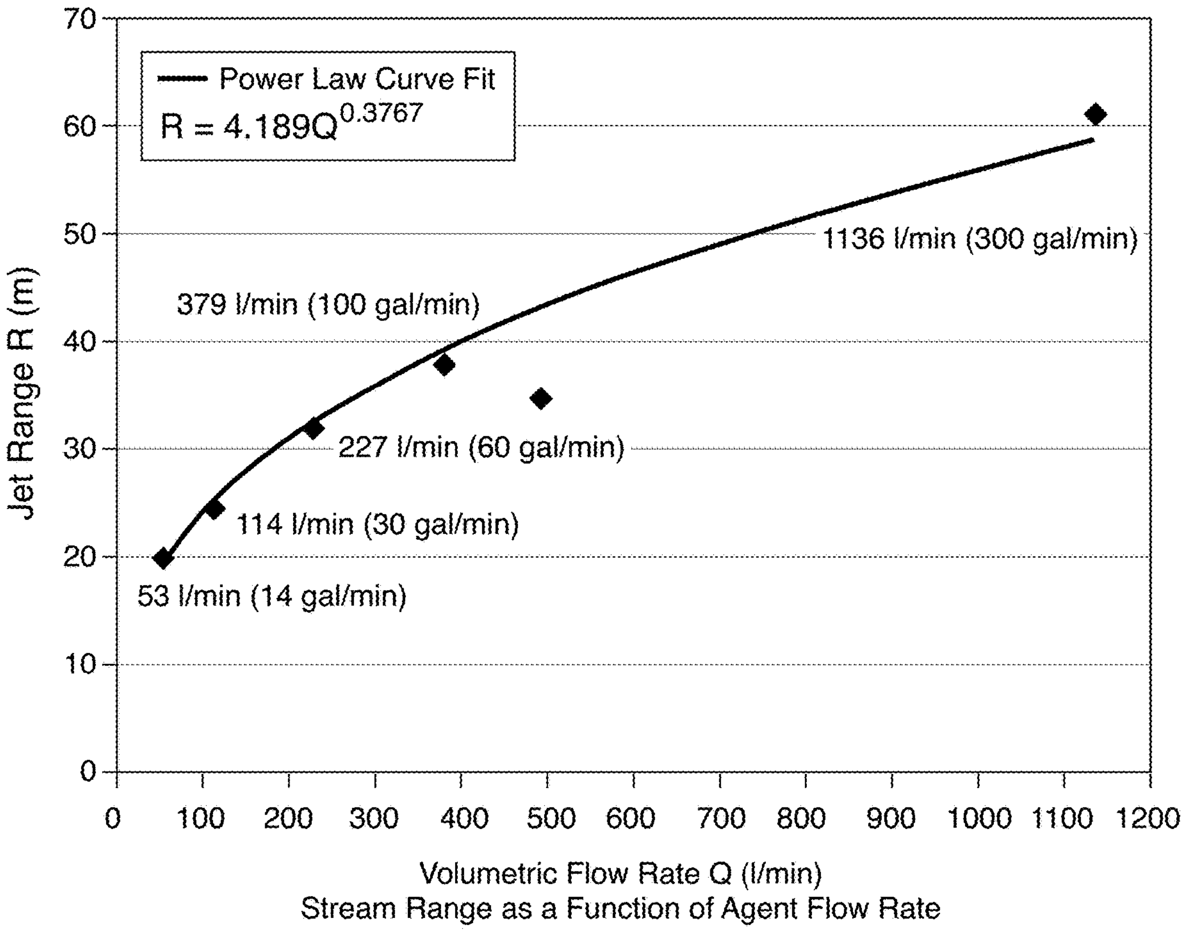
FIG. 8A is a diagrammatic representation of the volume fraction of the fluid flow from a fire suppression device.

Referring to FIG. 8A, an example calculation is illustrated with no ambient wind conditions included. A curve fitting process based upon the five indicated data points results in the indicated Power Law Curve equation for foam stream range vs. foam stream flow rate. Including the effects of wind on the foam trajectory, the relationship between elevation angle, azimuth angle and range will be much more complex, but they can be programmed into an automated system. With respect to environmental factors, the system must compensate for ambient wind conditions in order to land the foam or water stream directly onto the fire. With respect to environmental factors, the system must compensate for ambient wind conditions to land the foam or water stream directly onto the fire. Inputs of wind speed and direction are received from the anemometer included in targeting system 30 and the straight-line and azimuth distance to the fire are determined from the laser rangefinder included in targeting system 30. Inputs of wind speed and direction are received from the anemometer included in targeting system 30 and the straight-line and azimuth distance to the fire are determined from the laser rangefinder included in targeting system 30. A self-correcting adjustment feedback loop utilizes thermal camera 25 and/or the targeting system 30 to detect the distance from the impact point of the first fluid pulse to the detected fire condition and recalculates the appropriate azimuth and elevation angles. This repeats iteratively to both correct initial misalignment as well as maintain contact of the fluid flow with the proper aspect of the fire, including continuous input of thermal, distance and environmental conditions, all of which are dynamic. Additionally, control system 10 determines whether the fluid will be delivered in the individual pulse mode or as a continuous stream until thermal camera system detected that the fire had been extinguished.

When the fire suppression fluid includes foam, it will extinguish the fire by forming a stable film over the surface that is burning and will not allow oxygen to reach the surface nor fuel vapor to escape from the surface, thereby smothering the fire and avoiding re-ignition. When suppressing a fuel pool fire, control system 10 adjusts the location of nozzle 55 so that the foam stream starts at one edge of the pool and starts to build a film layer to keep oxygen away from the surface fire. Nozzle 55 is slowly moved by electronic control of horizontal and vertical electronic motors 65, 45 to build up a layer of foam across the top of the burning fuel and extinguish the fire. This dispersion pattern is more effective than a traditional oscillating fluid delivery as it builds the layer thickness up from one side and lets it grow across the pool. This technique both extinguishes the fire and reduces flashback that may occur with an oscillating fluid deliver which attempts to cover the entire surface. This also results in conservation of the limited supply of fire suppression fluid as a reserve against another break out or flashback.

Figure 8B:
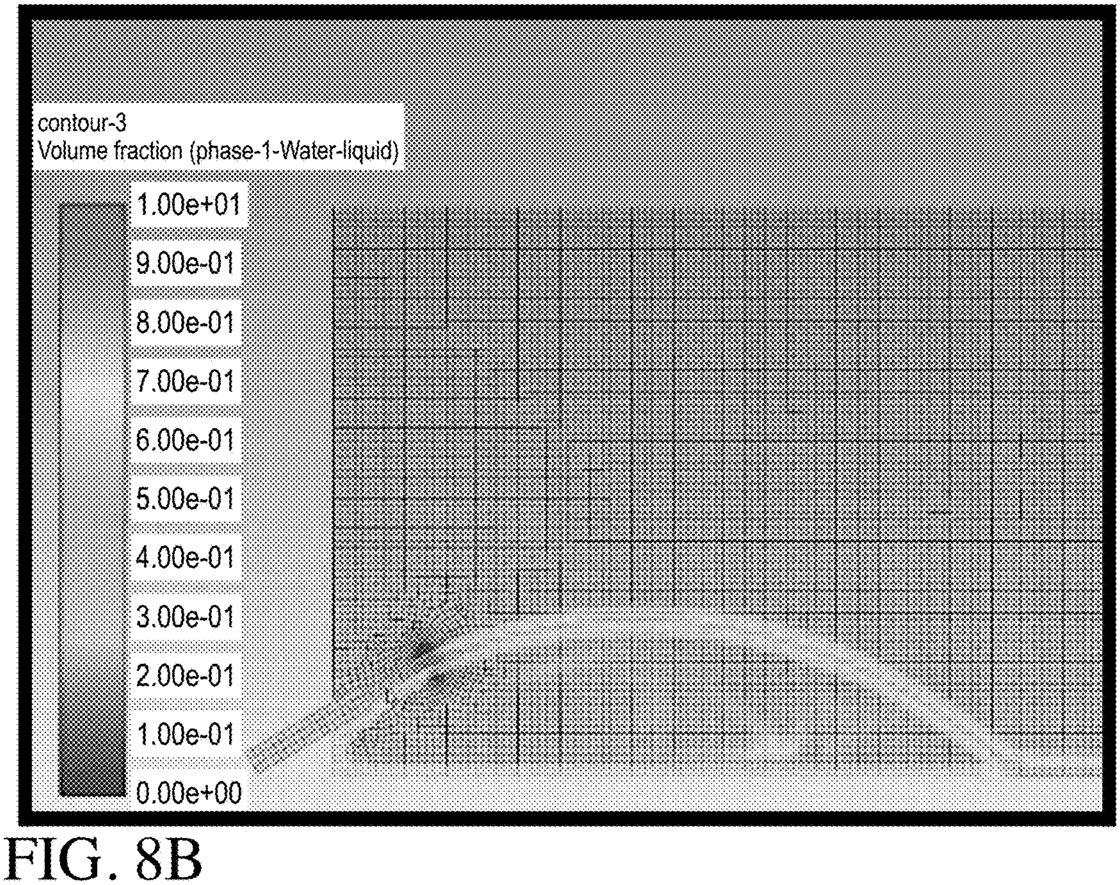
FIG. 8B is a diagrammatic representation of the velocity of the fluid flow from a fire suppression device.
Figure 8C:
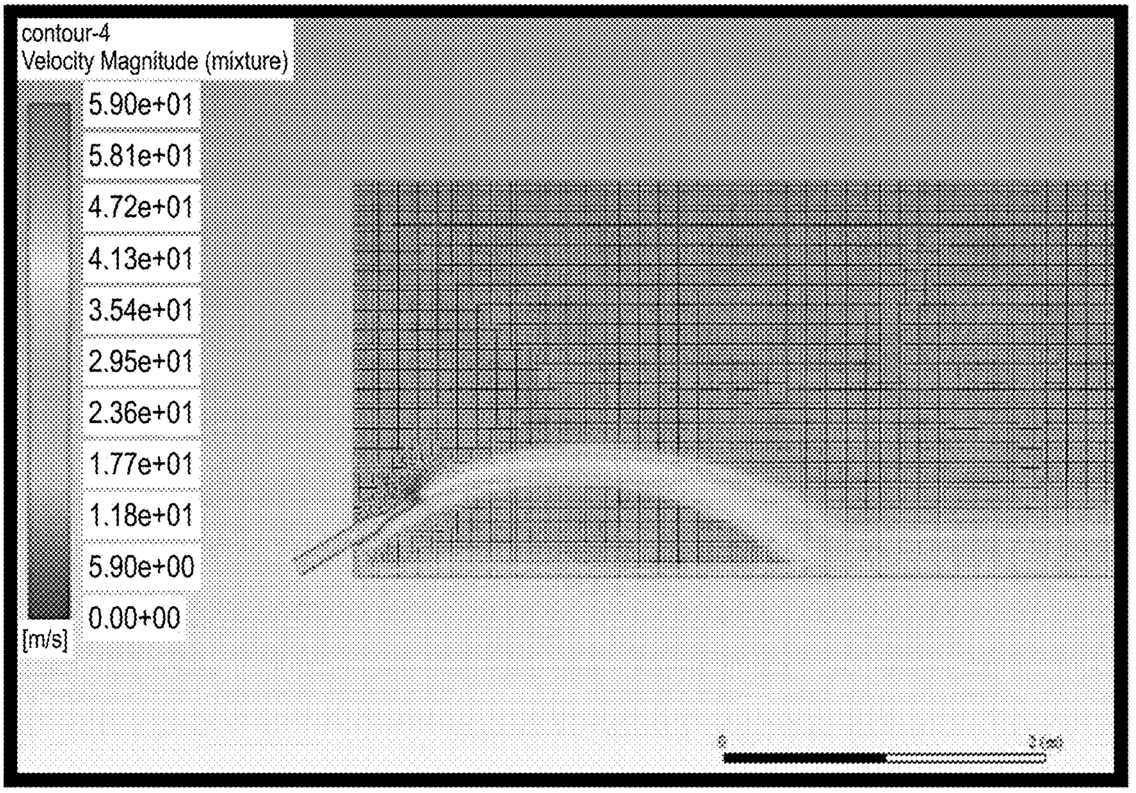
FIG. 8C is a diagrammatic representation of the velocity of the fluid flow from a fire suppression device.

FIGS. 8A and 8B relate to a CFD parametric study conducted to analyze how variation in nozzle flow conditions and fluid properties affect the overall jet stream performance. The above described single phase flow transitioning into two phase flow under variable wind conditions could not be modeled mathematically. As a result, CFD was used as a basis for the predetermined mathematical algorithms for aiming nozzle 55 precisely so that the foam will land on the hottest part of the fire.

Foam trajectory is accurately calculated with the inputs of nozzle 55 internal geometry, which is a constant, the pressure within nozzle 55, and the current wind speed and direction measured by the anemometer. For an outdoor fire suppression system, the anemometer is mounted adjacent to the nozzle. In the case of an indoor fire suppression system, the anemometer may also be located remotely but within the area to be protected. The default method of attack is to prioritize fire threats according to size and range. It is specifically contemplated that multiple fire detection subsystem and multiple fire suppression subsystems may be controlled by a single control system 10, for example in different areas of the same building. When multiple systems are employed, the controlling system stays in constant communication with the array of subsystems. Based on the fire threat target data acquired, the system will decide if it will be able to suppress the fire (if the fire is within the system's fire suppressing range) and deploy CAF or water in a fire suppressing pattern.

Fire suppressing patterns include: steady stream, pulsating stream, oscillating stream and specific pattern stream, e.g., left to right, chasing the heat source. The system will not discharge if the target is determined to be beyond its range. In a mobile embodiment, as described more fully below, the mobile device can be moved closer to the fire. In a multiple suppression subsystem array, transition to another subsystem nearer to the fire will be initiated. Additionally, multiple subsystems can engage a fire if its size or complexity overwhelms a single subsystem.

In operation, and with reference to FIG. 7, a non-limiting example of a fire detection process would begin with the prescan mode 175. In this mode, thermal camera 25 is aimed at a preselected start point for scanning, typically at one extreme of the area to be monitored. This will include control subsystem 10 and/or targeting system 30 directing horizontal and vertical motors 65,46 to an extreme position. It is specifically noted that thermal camera 25 may be panned to permit scanning of an area larger than the visible field of thermal camera 25. Once thermal camera 25 is positioned in the start position, the system moves to scanning step 180. The scanned area is subdivided into scan sectors for each system as illustrated in FIGS. 5A and 5B. The thermal camera 25, primary armature 40, horizontal gearbox 60 and horizontal electronic motor 65 are all cooperatively mounted to permit a swivel of thermal camera 25 to provide a field of view of up to 350°. Preferably each individual field of view of thermal camera 25 is 70°. Control subsystem 10 is provided with conventional electronic controls to permit the operator to select any scan rate or field of view with certain preselected options, e.g., 70°, 140°, or 210° sectors with a selector switch. The selected field of view sector is scanned using the thermal camera searching for incidents meeting certain preselected thermal thresholds which would indicate flames. Thermal camera 25 is selected to provide clear thermal images in total darkness, light fog, or smoke. Preferably the selection algorithm is predefined to search for targets that are at least one square foot in size. In an exemplary embodiment, each sector is scanned for time $t_1$ which may be two to three seconds or adjusted for conditions. If no fire is detected, the system moves on to scan the adjacent sector at sector adjustment block 185. Sub-modes of scanning operation may include various degrees of user-selectable automated operation user utilizing conventional analog or digital displays, switches, pads or the like. A semi-automatic scanning sub-mode may permit scanning with audible alerts, such as a siren and/or a visible flashing light. Utilizing various means of network communications, messages can be sent to, e.g., a phone, a central monitoring station or to a fire station. Consistent with network communications to a phone or other smart mobile device, a mobile phone or other web application would enable full or limited control of the system by remote users. If a fire condition is detected with temperatures above a preselected threshold and/or the number of pixels 25C indicating temperatures exceeding a threshold is itself above a preselected threshold, the system proceeds to detection mode 190. Scan mode 180 of the system includes a target selection process with a preferential lower threshold for a thermal event exceeding one square foot or multiple events meeting the various preselected thresholds. In the case of multiple events, the decision process must include a prioritization of the events if there are not multiple suppressions systems available.

It is specifically noted that the detection, adjustment and suppression modes discussed herein may operate simultaneously or in different order than described in the preferred embodiment to provide dynamic, environmentally sensitive suppression.

Detection mode 190 utilizes input from thermal camera 25 to determine the number of flame events are in the visible field and their relative size to identify a center of flame 27 of the largest flame. The flames are categorized on a dynamic basis based on size. The system will adjust the direction of nozzle 55 by control of vertical and horizontal motors 45, 65 to target the center of flame 27. A feedback loop having a center adjustment block 195 permits continuous recalibration of nozzle 55 to the center of flame 27.

Once the center of flame 27 has been targeted by nozzle 55 and thermal camera 25, the range to the flame is determined by the LiDAR system in range mode 200. If the range to the flame exceeds the preselected threshold capability of the pumping system, the system determines whether this is a mobile system at mobility status check 205. If the system is not mobile, but there are other units under control, as determined at multiple unit status check 210, then the suppression signal is handed off to another unit. If the system does not include multiple units, a determination of beyond range resets the system back to scan mode. Preferably an alarm is indicated for manual or other fire suppression to occur.

In the event that the system is mobile, then it is repositioned at location adjustment 215 to move closer to the flame, either by manual or automatic control, as discussed more fully above.

In the preferred embodiment, thermal camera 25 and targeting system 30 have an effective range of approximately 165 feet but the fire suppression aspect of the system is generally considered accurate only up to about 120 feet. Target selection is based upon the perceived size of the thermal event and the distance to the targeted event. The target's distance is verified using the laser rangefinder to enhance accuracy and precision fire suppression with minimum expenditure of fire suppression fluid. In the event that the target is detected with a range of 65 feet or less, the fire suppression fluid stream will be directly aimed at the target. In the event of a target at a range between 65 feet to 120 feet, the system will include a ballistic trajectory calculation to accurately strike the target.

The system will then (or otherwise during other steps) enter into windage correction mode 220 which reviews the center of flame 27 and target location and makes adjustments to locate the stream at the correct place as described more fully with respect to FIGS. 4A and 4B.

At automatic mode status check 225 a determination is made as to whether the system is in automatic mode, which permits fire suppression without manual intervention. If manual intervention is required, it may be alarmed and initiated at manual start 230. In the event that a timeout is set at timeout status check 235 to either send the system back to prescan if the time is exceeded or override the manual start at override status check 240. In this event, the system proceeds on automatic mode.

Upon completion of the automatic mode status check 225 in the automatic mode, or alternatively upon manual start status 230 being engaged, valve initiation 245 is engaged and the suppression medium is introduced to nozzle 55 for ejection and targeting. A timer circuit 250 may be engaged to permit the valve to be opened for a preselected time or the valve may remain open through suppression as discussed below.

In the event that the system is in a mode requiring a sweeping stream of fluid, a counter circuit 255 may be employed to track the periodic cycles of the sweeping motion of nozzle 55 at nozzle displacement mode 252 through the activation of horizontal electronic motor 65 at motor adjustment step 253 to adjust the horizontal axis 65A of the unit. Sensor outputs from thermal camera 25 and the fire detection subsystem 5 are input at scan sensor input 260 to assist in any non-cyclical adjustments of the horizontal axis 65A travel. As stated previously, environmental factors and changes in the flame are continuously detected and dynamically adjusted during fire suppression, irrespective of mode.

Scan sensor input 260 is also utilized to determine if the fire has been suppressed at fire suppression status check 265 and if so, the system proceeds to close the valve and return to prescan mode 175 at return step 270. If not, then fire suppression continues at nozzle displacement step 252 and all dynamic systems remain engaged.

In the fully automated sub-mode, the fire suppression cycle will be initiated for each target acquired. This feature allows the system to effectively put out multiple flames in several fire suppression cycles. An emergency sub-mode may be initiated by the processor or by manual intervention if the fire is detected as increasing beyond preselected thresholds of capability, a CAF oscillating cycle may be engaged, in which the fire suppression mode will cause the dispersion of foam over an area of a preselected radius, with a preselected discharge time and application rate. This may continue the fluid supply is exhausted. The communication aspect of the system may also generate electronic signals indicating the status of the system at all times, including visual and enhanced visual (thermal) imagery, both locally and remotely.

Fire Suppression Activation Subsystem CAF fire suppression systems utilize compressed air to propel firefighting foam.

Thousands of small bubbles bound together in a foamy, thin gel quickly smother a fire by heat removal and oxygen deprivation. The CAF also provides a thick vapor-sealing blanket of foam on the targeted surface that virtually eliminates reignition. The fire extinguishing foam is a mix of water, fluorine free foam concentrate, and air and/or nitrogen under pressure. The proportion of water to foam is kept at a specific ratio, depending on the application, e.g., the suppression of Class B fires. The most common ratio is 1:0.03, 3% fire extinguishing foam to every unit of water.

Figure 9:
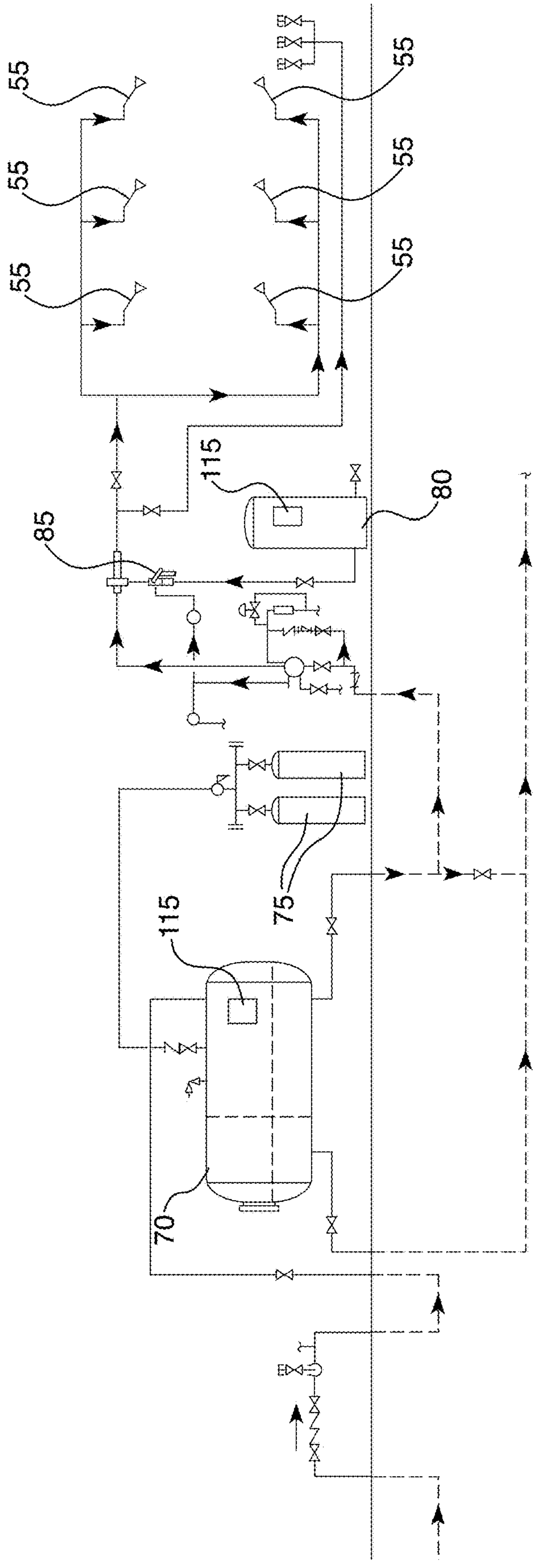
FIG. 9 is a diagrammatic representation of the fire detection and suppression system.
Figure 10:
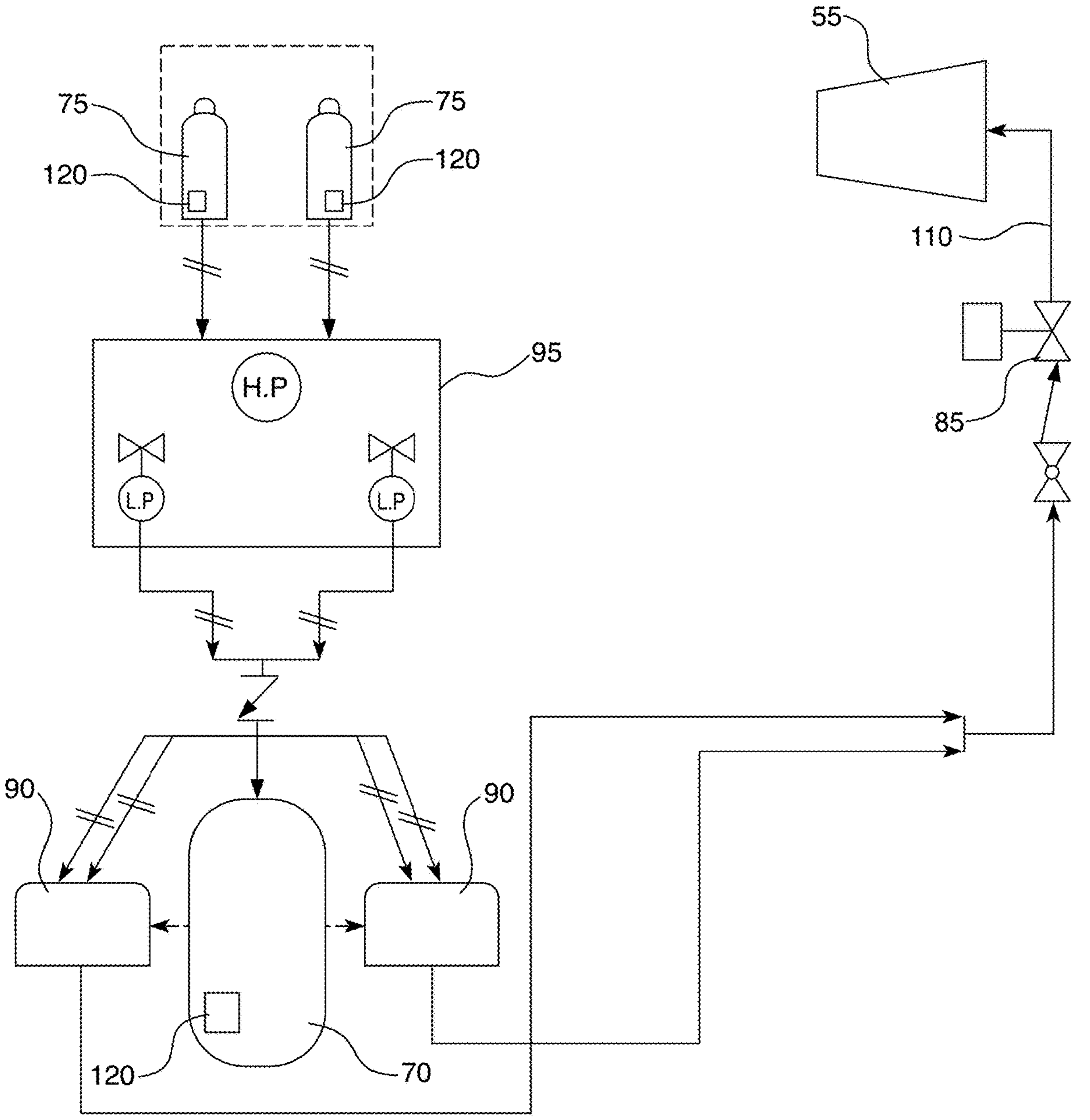
FIG. 10 is a diagrammatic representation of the fluid components of the fire detection and suppression system.

Referring now to FIGS. 1-3, 9 and 10, with FIG. 9 representing a generic fixed system and FIG. 10 representing either a fixed or mobile system, fluids may be piped through permanent or detachable supply hoses or pipes to the fire suppression activation subsystem 15. In a portable or mobile system, the fluids are stored in connection with the system which is free-standing.

Foam systems may consist of a fluorine free foam concentrate storage vessel, a water supply, and proportioner. Preferably a pre-mixed reservoir of water and foam at a 3% concentration is kept at 10 atm/150 PSI pressure in fluid tank 70. A non-limiting example would include a 200 gallon capacity of tank 70 holding premixed solution which would convert to approximately 4000 gallons of finished foam, discharged at a rate of 650 gallons per minute through one or two nozzles on each system. It is specifically contemplated that multiple fluid tanks 70 may be associated with any system, fixed or mobile. Pressurized air may be permanently or selectively connected to the fire suppression and activation subsystem in a fixed or skid embodiment or stored in connection with the system in air tanks is also stored in air tanks 75, preferably at 200 atm/3000 PSI pressure. As with the fluid tank 70, single or multiple air tanks 75 of varying sizes and pressure capacities may be included in embodiments.

In operation, fire suppression activation subsystem 15 causes the high-pressure air from air tanks 75 through air regulators 95 that depress the pressure from 200 atm/3000 PSI to 10 atm/150 PSI. The air regulators 95 keep the foam supply pressure constant under high pressure. The lower pressurized air maintains pressure in fluid tank 70 and is used to create the foam. The pre-mix fluid flows from fluid tank 70 through manifold 90 designed to add the air to the liquid in order to create the foam. A motorized valve 85 is operated by the control subsystem 10 to permit or restrict fluid flow with an open/close time of no more than three seconds. A flexible hose 110 connects the motorized valve 85 to the primary armature 40 to permit movement of primary armature 40 and ultimately nozzle 55. The flexible hose 110 is preferably secured interior to mast 105 which supports fire detection subsystem 5. Each fire suppression cycle will preferably last 20 seconds. The control subsystem 10 in cooperation with fire detection subsystem 5 brackets the fire with CAF, applying foam from the outer fire perimeter and circling in tighter passes as the fire subsides. Thermal camera 25 rescans the sector for four seconds, to detect one of the following possible conditions: (i) fire is out, the area is cold; (ii) fire is out, the area is hot; and (iii) fire is still burning. Conditions (ii) and (iii) will re-engage the system for additional 20 seconds of operation. If the area has cooled down and no additional targets in the sector have been identified, the system will now return to scan mode.

Monitoring and Management Subsystem

Fluid tank 70, as well as foam tank 80 in a fixed embodiment not utilizing pre-mixed water and concentrate, are provided with fluid level detector 115 for measuring the content volume. Pressure sensors 120 are also installed in the tanks 70, 75 and 80 for measuring the pressure. Such sensors 115, 120 will also be installed in the inlet piping of water supplies when required for fixed embodiments. The fluid level detectors 115 and pressure sensors 120 are in electronic communication with control subsystem 10 and the output of such sensors 115, 120 are used as inputs for such control subsystem 10 for control of air regulator 95 and other associated conventional valves and indicators for monitoring and operating the system, whether by manual or automatic control as will be discussed more fully with reference to FIG. 11. As described above, control subsystem 10 may be in electronic communication with various devices, both local and remote by wired or wireless networks for operation and control.

Referring now to FIG. 11, with tangential reference to the preceding figures, the system 1 may be integrated with a previously installed permanent fire suppression system in a building or other structure. In that event, the system 1 will need to interact with the existing system through a series of inputs and outputs. Control Subsystem 10 initiates communication by any known method to the facility's Fire Alarm Control Panel and Central Monitoring Station. These two items are not part of system 1 but are connected to perform certain functions in accordance with Table 1. Number references relate to inputs at the right of FIG. 11 and letter references relate to outputs at the top of FIG. 11.

TABLE 1

| INPUT | OUTPUT/RESULT |
|---|---|
| 1. Activation of Flame Detector | A. Display Alarm Point Address and Description at Fire Alarm Control Panel.<br>B. Record Events in the Fire Alarm Control Panel System History Memory.<br>C. Activate Facility Alarms-LED and Audible Piezo at Fire Alarm Control Panel.<br>J. Activate Audible/Visible Notification Appliances Temporal Three Throughout Building.<br>N. Release Foam Solenoid Valve.<br>R. Transmits Flame Detector Alarm Signal to the Central Monitoring Station. |
| 2. Activation of Foam Manual Release | A. Display Alarm Point Address and Description at Fire Alarm Control Panel.<br>B. Record Events in the Fire Alarm Control Panel System History Memory.<br>C. Activate Facility Alarms-LED and Audible Piezo at Fire Alarm Control Panel.<br>J. Activate Audible/Visible Notification Appliances Temporal Three Throughout Building. |
| 3. Activation of Alarm Discharge Pressure or Waterflow Switch | A. Display Alarm Point Address and Description at Fire Alarm Control Panel.<br>B. Record Events in the Fire Alarm Control Panel System History Memory.<br>C. Activate Facility Alarms-LED and Audible Piezo at Fire Alarm Control Panel.<br>J. Activate Audible/Visible Notification Appliances Temporal Three Throughout Building.<br>T. Transmit Waterflow Alarm Signal to the Central Monitoring Station. |
| 4. Activation of Maintenance Key Switch to Disable Position | A. Display Alarm Point Address and Description at Fire Alarm Control Panel.<br>B. Record Events in the Fire Alarm Control Panel System History Memory. |

TABLE 1-continued

| INPUT | OUTPUT/RESULT |
|---|---|
| | D. Activate Supervisory Alarms-LED and Audible Piezo at Fire Alarm Control Panel.<br>F. Inhibit the Release of the Foam Solenoid Valve.<br>V. Transmit Supervisory Signal to the Central Monitoring Station. |
| 5. Activation of Low Compressed Air Pressure Switch | A. Display Alarm Point Address and Description at Fire Alarm Control Panel.<br>B. Record Events in the Fire Alarm Control Panel System History Memory.<br>D. Activate Supervisory Alarms-LED and Audible Piezo at Fire Alarm Control Panel.<br>V. Transmit Supervisory Signal to the Central Monitoring Station. |
| 6. Activation of Fire Protection Valve Tamper Switch | A. Display Alarm Point Address and Description at Fire Alarm Control Panel.<br>B. Record Events in the Fire Alarm Control Panel System History Memory.<br>D. Activate Supervisory Alarms-LED and Audible Piezo at Fire Alarm Control Panel.<br>V. Transmit Supervisory Signal to the Central Monitoring Station. |
| 7. Activation of Wire Fault, Short, Ground, Or Other System Failure | A. Display Alarm Point Address and Description at Fire Alarm Control Panel.<br>B. Record Events in the Fire Alarm Control Panel System History Memory.<br>E. Activate Trouble Alarms-LED and Audible Pressure at Fire Alarm Control Panel.<br>W. Transmit Trouble Signal to the Central Monitoring Station. |

In application, the system may be composed of one or many fixed or mobile assemblies strategically located through the facility. The monitor constantly scans the target area for the presence of fire.

In addition to the actuation of the fire suppression system, the system 1 visually monitors and records events and communicates with conventional fire alarm control panels or other monitoring sites. The system 1 may be part of a mesh wireless local area network with bi-directional communication.

While a present preferred embodiment of the invention is described, it is to be distinctly understood that the invention is not limited thereto, but may be otherwise embodied and practiced with the scope of the following claims.

What is claimed is:

1. A fire detection and suppression system comprising:

a fire detection subsystem providing continuous electronic data signals indicative of a fire suppression target and detected changes in environmental parameters, said fire detection subsystem having:

at least one thermal sensor;

at least one optical sensor;

at least one distance sensor;

at least one wind sensor; and at least one fire detection motor for horizontal and vertical displacement of said fire detection subsystem;

a control subsystem in electrical communication with each component of said fire detection subsystem, said control subsystem having:

a processor; and a memory storing said data indicative of detected environmental parameters and system operational data;

a fire suppression subsystem in electrical communication with said control subsystem having:

at least one fire suppression fluid source selected from:

at least one fluid input and at least one storage tank;

at least one valve in electronic communication with said control system and fluid communication with said at least one fire suppression fluid source, said at least one valve for controlling a flow of fire suppression fluid;

a fire suppression fluid delivery nozzle in fluid communication with said at least one valve, said fire suppression fluid delivery nozzle being physically affixed to at least one motor for horizontal and vertical displacement of said fire suppression fluid delivery nozzle, said at least one motor being in electronic communication with said control subsystem; and a monitoring and management subsystem in electronic communication with said control subsystem and fluid communication with said fire suppression subsystem directing said fire suppression fluid at said fire suppression target, said monitoring and management subsystem:

having at least one fluid sensor to detect at least one of presence, absence and flow parameters of said fire suppression fluid;

receiving said continuous electronic data signals from said fire detection subsystem;

generating displacement electronic signals in response to changes in said continuous electronic data signals, said displacement electronic signals directed at said fire suppression subsystem to dynamically maintain said flow of said fire suppression fluid at said fire suppression target by activation of at least one of:

said at least one motor to displace said fluid delivery nozzle; and said at least one valve to adjust said flow parameters of said at least one fire suppression fluid.

2. The system of claim 1, wherein said at least one thermal, optical, distance and wind sensors are affixed to said at least one fire suppression subsystem motor such that said at least one fire suppression subsystem motor directs said sensors in a common direction.

3. The system of claim 2, wherein said sensors are redirected by movement of said at least one fire suppression subsystem motor in two dimensions.

4. The system of claim 1, wherein said at least one fire suppression subsystem motor further comprises a vertical motor and a horizontal motor for two dimensional displacement, said fire suppression subsystem motors being in electrical communication with said control subsystem.

5. The system of claim 1, wherein said fire detection and suppression system is in fluid communication with an external fluid source by said at least one fluid input.

6. The system of claim 1, wherein said fire suppression fluid comprises at least one of water, air and compressed air foam concentrate.

7. The system of claim 1, wherein at least one of said thermal sensor and said optical sensor is a thermal camera.

8. The system of claim 1, wherein said distance sensor is at least one of a laser and LiDAR.

9. The system of claim 1, wherein said wind sensor is an anemometer.

10. A fire detection and suppression system comprising:

a fire detection subsystem providing data indicative of detected environmental parameters, said fire detection subsystem having:

at least one thermal sensor;

at least one optical sensor;

at least one distance sensor;

at least one wind sensor; and at least one fire detection motor for horizontal and vertical displacement of said fire detection subsystem;

a fire suppression subsystem in electrical communication with a control subsystem having:

at least one fire suppression fluid source selected from:

at least one fluid input and at least one storage tank;

at least one valve in electronic communication with said control subsystem and fluid communication with said at least one fire suppression fluid source, said at least one valve for controlling a flow of said at least one fire suppression fluid;

a fire suppression fluid delivery nozzle in fluid communication with said at least one valve, said fire suppression fluid delivery nozzle being physically affixed to at least one fire suppression motor for horizontal and vertical displacement of said fire suppression fluid delivery nozzle, said at least one fire suppression motor being in electronic communication with said control subsystem; and a monitoring and management subsystem in electronic communication with said control subsystem and fluid communication with said fire suppression subsystem, said monitoring and management subsystem having at least one fluid sensor to detect at least one of presence, absence and flow parameters of said at least one fire suppression liquid;

said control subsystem in electrical communication with each component of said fire detection subsystem, said fire suppression subsystem and said monitoring and management subsystem, said control subsystem having:

a processor; and a memory storing said data indicative of detected environmental parameters and system operational data; and said control subsystem configured for:

receiving said data indicative of detected environmental parameters from said fire detection subsystem;

generating and transmitting a control signal to said at least one fire detection motor to cause at least one of horizontal and vertical displacement of at least a portion of said fire detection subsystem in a scanning mode;

comparing said data indicative of detected environmental parameters with said system operational data;

generating and transmitting a suppression signal to at least one of: said fire suppression subsystem and said at least one valve upon detection of a fire condition based upon said data comparison causing said fire suppression system to deliver said at least one fire suppression fluid at a target location determined by said comparison of said data indicative of detected environmental parameters with said operational data;

receiving additional data indicative of at least one of detected environmental parameters and changes in said target location;

generating additional suppression signals to at least one of:

said fire suppression subsystem, said fire suppression motor and said at least one valve to cause at least one of additional horizontal and vertical displacement of said fire suppression fluid delivery nozzle; and changes to flow parameters of said fire suppression fluid;

based upon changes in said at least one of detected environmental parameters and changes in said target location to continuously deliver said at least one fire suppression fluid at said target location; and terminating flow of said fire suppression fluid upon cessation of fire condition.

11. The system of claim 10, wherein said at least one fire detection subsystem sensor further comprises at least one of a thermal camera, an anemometer, a laser rangefinder, and a thermometer, each continuously generating at least one electronic signal indicative of detected environmental parameters.

12. The system of claim 10, wherein said control subsystem continuously receives electronic communication of detected environmental parameters.

13. The system of claim 12, wherein said fire suppression fluid is delivered to a highest temperature region of a flame based upon at least one of flame size, movement, intensity and behavior.

14. The system of claim 10, wherein said generated suppression signals are continuously and dynamically modified based upon said data indicative of said detected environmental parameters.

15. The system of claim 10, wherein said control subsystem is in electronic communication with a display device and provides a graphic representation of said data indicative of detected environmental conditions on a continuous basis.

16. The system of claim 10, wherein said control subsystem continually operates in a scanning mode obtaining data indicative of detected environmental conditions of a preselected geographic area.

17. The system of claim 16, wherein said control subsystem generates an electronic signal indicative of movement of said preselected geographic area to a different geographic area.

18. The system of claim 16, wherein said control subsystem generates an electronic signal indicative of a detected flame based upon said data indicative of detected environmental conditions which is dynamically modified to detect a center of the flame.

19. The system of claim 16, wherein said control subsystem receives an electronic signal indicative of a movement of a detected flame beyond a preselected threshold based upon said data indicative of detected environmental conditions and generates an electronic signal to engage at least one of: (i) movement of the fire detection and suppression system to a location placing the flame within said preselected threshold and (ii) transfer of fire suppression activity to a second fire detection and suppression system within said preselected threshold.

20. The system of claim 1, wherein said control subsystem generates an electronic signal indicative of a detected flame which is dynamically modified to detect the center of the flame and adjust said fire suppression fluid delivery nozzle location and pressure to adjust for at least one of change in distance to the flame or windage.

21. The system of claim 16, wherein said control subsystem generates an electronic signal indicative of at least one of detected flame movement or change in wind conditions which initiates an oscillation sequence of said fire suppression subsystem.

22. The system of claim 21, wherein said control subsystem detects data indicative of at least one of increasing temperature and intensity of said flame to locate a flame center.

23. The system of claim 21, wherein said oscillation sequence is governed by preselected parameters of at least one of displacement angle or zones.

24. The system of claim 10, wherein said at least one thermal, optical, distance and wind sensors are affixed to said at least one fire detection motor such that said at least one fire detection motor directs said sensors in a common direction.

25. The system of claim 10, wherein said fire detection subsystem, said control subsystem, said fire suppression subsystem and said monitoring and management subsystem are mounted to a common platform.

26. The system of claim 25, wherein said platform is selected from fixed or mobile.

27. The system of claim 26, wherein said platform is mobile and further comprises at least one electronic motor for self-propelled operation.

28. The system of claim 26, wherein said platform is mobile and said control system is in electronic communication with a remote station.

29. The system of claim 10, wherein said at least one fire detection motor further comprises a vertical motor and a horizontal motor for two dimensional displacement, said motors being in electrical communication with said control subsystem.

30. The system of claim 10, wherein a plurality of said fire detection and suppression systems are in common electronic communication.

31. The system of claim 30, wherein said fire detection and suppression systems are in electronic communication with at least one of building security systems and fire detection systems.

32. The system of claim 10, wherein said fire detection and suppression system is in fluid communication with an external fluid source by said at least one fluid input.

33. The system of claim 10, further comprising an independent power source.

34. The system of claim 10, wherein said fire suppression fluid comprises at least one of water, air and compressed air foam concentrate.

35. The system of claim 10, wherein at least one of said thermal sensor and said optical sensor is a thermal camera.

36. The system of claim 10, wherein said distance sensor is at least one of a laser and LiDAR.

37. The system of claim 10, wherein said wind sensor is an anemometer.

* * * * *